(12) United States Patent
Fukunaga et al.

(10) Patent No.: US 11,718,369 B2
(45) Date of Patent: Aug. 8, 2023

(54) BICYCLE SPROCKET

(71) Applicant: SHIMANO INC., Sakai (JP)

(72) Inventors: Yasufumi Fukunaga, Sakai (JP); Shota Suyama, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/964,037

(22) Filed: Oct. 12, 2022

(65) Prior Publication Data

US 2023/0030458 A1 Feb. 2, 2023

Related U.S. Application Data

(63) Continuation of application No. 16/255,826, filed on Jan. 24, 2019, now Pat. No. 11,518,474.

(51) Int. Cl.
*B62M 9/12* (2006.01)
*F16H 55/30* (2006.01)

(52) U.S. Cl.
CPC ............... *B62M 9/12* (2013.01); *F16H 55/30* (2013.01)

(58) Field of Classification Search
CPC ............ B62M 9/12; B62M 9/10; F16H 55/30
See application file for complete search history.

(56) References Cited

U.S. PATENT DOCUMENTS

| | | | |
|---|---|---|---|
| 5,632,699 A | 5/1997 | Nakamura | |
| 5,738,603 A | 4/1998 | Schmidt et al. | |
| 6,045,472 A | 4/2000 | Sung et al. | |
| 6,340,338 B1 | 1/2002 | Kamada | |
| 9,701,364 B2 | 7/2017 | Sugimoto et al. | |
| 9,885,409 B1 | 2/2018 | Fukunaga | |
| 9,915,336 B1 | 3/2018 | Fukunaga | |
| 11,028,916 B2 | 6/2021 | Fukunaga et al. | |
| 2002/0128097 A1 | 9/2002 | Takebayashi | |

(Continued)

FOREIGN PATENT DOCUMENTS

CN 107813900 3/2018

OTHER PUBLICATIONS

Office Action with Form PTO-892 Notice of References Cited issued by the U.S. Patent and Trademark Office for the U.S. Appl. No. 16/255,826, filed Jul. 1, 2021.

(Continued)

*Primary Examiner* — Michael R Mansen
*Assistant Examiner* — Juan J Campos, Jr.
(74) *Attorney, Agent, or Firm* — Mori & Ward, LLP

(57) ABSTRACT

A bicycle sprocket comprises a sprocket body, a plurality of sprocket teeth, and a torque transmitting profile. The sprocket body has an outer periphery and an inner periphery positioned radially inwardly from the outer periphery with respect to a rotational center axis of the bicycle sprocket. The plurality of sprocket teeth is disposed on the outer periphery of the sprocket body. The torque transmitting profile is positioned around the inner periphery of the sprocket body. The torque transmitting profile includes at least ten internal spline teeth. The at least ten internal spline-teeth include at least one first internal spline-tooth, at least one second internal spline-tooth and at least one third internal spline-tooth. The at least one internal first spline-tooth, the at least one second internal spline-tooth and the at least one third internal spline-tooth are different in shape from each other.

22 Claims, 29 Drawing Sheets

(56) References Cited

U.S. PATENT DOCUMENTS

| | | |
|---|---|---|
| 2004/0043855 A1 | 3/2004 | Wei |
| 2008/0188336 A1 | 8/2008 | Tokuyama |
| 2009/0042679 A1* | 2/2009 | Valle ..................... B62M 9/10 |
| | | 474/160 |
| 2011/0092327 A1 | 4/2011 | Oishi |
| 2015/0285358 A1 | 10/2015 | Numata et al. |
| 2016/0059930 A1 | 3/2016 | Fukunaga |
| 2016/0059931 A1 | 3/2016 | Fukunaga |
| 2016/0207590 A1 | 7/2016 | Fukumori |
| 2017/0029066 A1 | 2/2017 | Fukunaga et al. |
| 2017/0361901 A1 | 12/2017 | Tokuyama et al. |
| 2018/0022415 A1 | 1/2018 | Oishi |
| 2018/0073620 A1 | 3/2018 | Fukunaga |
| 2018/0099725 A1 | 4/2018 | Kamada et al. |
| 2018/0186429 A1 | 7/2018 | Nakamura |
| 2018/0194431 A1 | 7/2018 | Iwai et al. |
| 2018/0251189 A1 | 9/2018 | Kamada |
| 2018/0299004 A1 | 10/2018 | Ohno et al. |
| 2018/0304965 A1 | 10/2018 | Fukumori |
| 2018/0345723 A1* | 12/2018 | Fujita ................... B60B 27/023 |
| 2018/0346064 A1* | 12/2018 | Fujita ..................... B62M 9/10 |
| 2018/0346065 A1* | 12/2018 | Fujita ..................... B62M 9/10 |
| 2018/0346067 A1* | 12/2018 | Fujita ..................... F16H 55/30 |
| 2019/0031288 A1 | 1/2019 | Kamada |
| 2019/0047324 A1* | 2/2019 | Fujita ..................... B62M 9/10 |
| 2019/0061873 A1 | 2/2019 | Fujita et al. |
| 2019/0063585 A1* | 2/2019 | Fujita ..................... B62M 9/12 |
| 2019/0092425 A1* | 3/2019 | Fujita ..................... B60B 27/04 |
| 2019/0101204 A1 | 4/2019 | Fukunaga et al. |
| 2019/0127022 A1* | 5/2019 | Komatsu ................ F16H 55/30 |
| 2019/0359284 A1 | 11/2019 | Fukunaga et al. |
| 2019/0359285 A1 | 11/2019 | Emura et al. |
| 2020/0011408 A1 | 1/2020 | Yamazaki et al. |
| 2020/0140033 A1 | 5/2020 | Kamada et al. |
| 2021/0031877 A1 | 2/2021 | Zubieta Andueza |
| 2021/0031878 A1 | 2/2021 | Zubieta Andueza |

OTHER PUBLICATIONS

Office Action issued by the U.S. Patent and Trademark Office for the U.S. Appl. No. 16/255,826, filed Jan. 13, 2022.

* cited by examiner

BICYCLE SPROCKET

CROSS-REFERENCE TO RELATED APPLICATIONS

The present application is a continuation application of the U.S. patent application Ser. No. 16/255,826 filed Jan. 24, 2019. The contents of this application are incorporated herein by reference in their entirety.

BACKGROUND OF THE INVENTION

Field of the Invention

The present invention relates to a bicycle sprocket arrangement.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body, a plurality of sprocket teeth, and a torque transmitting profile. The sprocket body has an outer periphery and an inner periphery positioned radially inwardly from the outer periphery with respect to a rotational center axis of the bicycle sprocket. The plurality of sprocket teeth is disposed on the outer periphery of the sprocket body. The torque transmitting profile is positioned around the inner periphery of the sprocket body. The torque transmitting profile includes at least ten internal spline teeth. The at least ten internal spline-teeth include at least one first internal spline-tooth, at least one second internal spline-tooth and at least one third internal spline-tooth. The at least one internal first spline-tooth, the at least one second internal spline-tooth and the at least one third internal spline-tooth are different in shape from each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
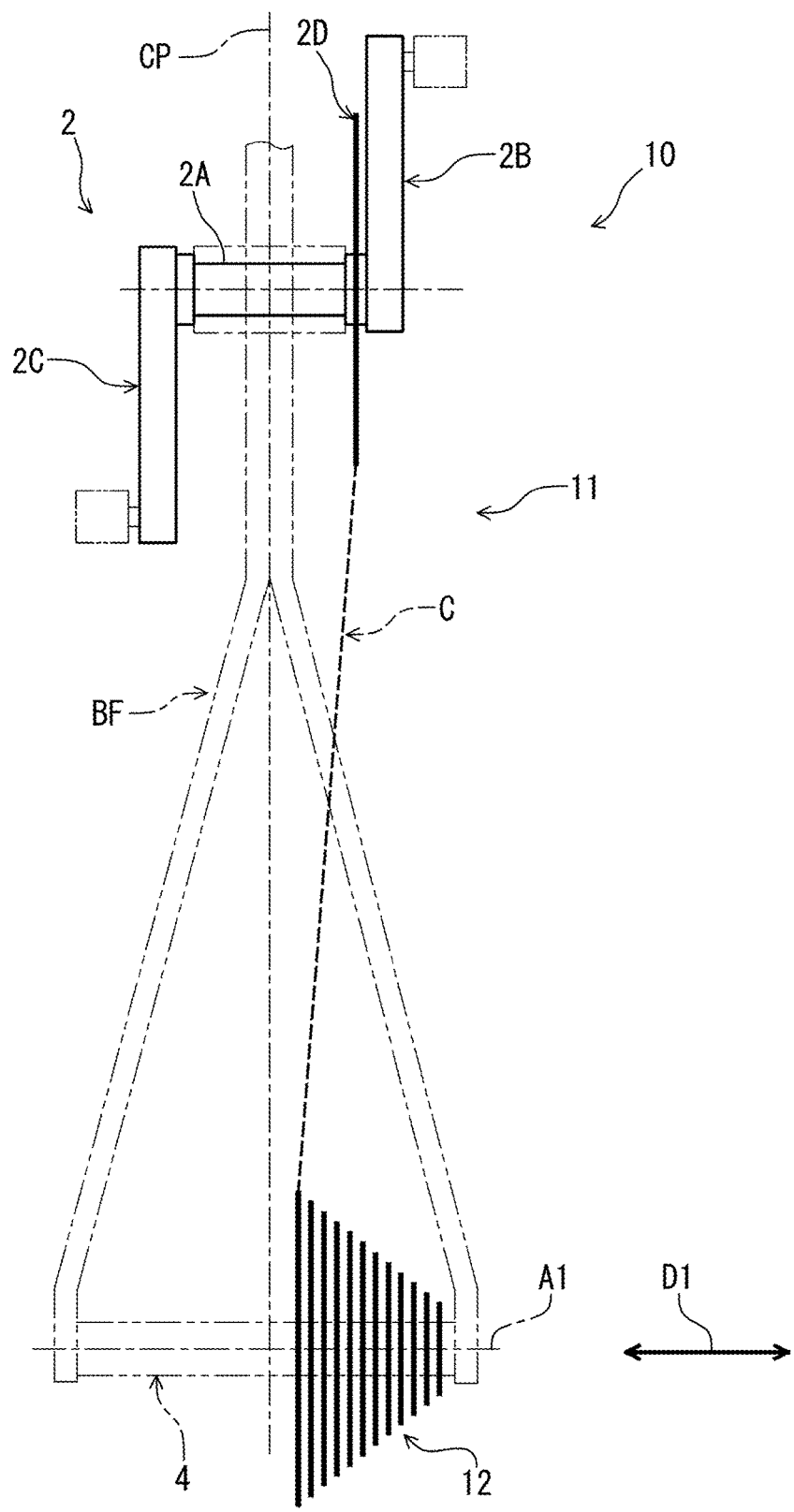
FIG. 1 is a schematic diagram of a bicycle including a bicycle sprocket arrangement in accordance with an embodiment.

The embodiment(s) will now be described with reference to the accompanying drawings, wherein like reference numerals designate corresponding or identical elements throughout the various drawings.

Referring initially to FIG. 1, a bicycle 10 includes a bicycle frame BF and a bicycle drive train 11. The bicycle drive train 11 comprises a crank assembly 2, a bicycle hub assembly 4, a bicycle sprocket arrangement 12, and a bicycle chain C. The bicycle sprocket arrangement 12 has a rotational center axis A1. The bicycle sprocket arrangement 12 is rotatably supported by the bicycle hub assembly 4 relative to the bicycle frame BF about the rotational center axis A1. The crank assembly 2 includes a crank axle 2A, a right crank arm 2B, a left crank arm 2C, and a front sprocket 2D. The right crank arm 2B and the left crank arm 2C are secured to the crank axle 2A. The front sprocket 2D is secured to at least one of the crank axle 2A and the right crank arm 2B. The bicycle chain C is engaged with the front sprocket 2D and the bicycle sprocket arrangement 12 to transmit a pedaling force from the front sprocket 2D to the bicycle sprocket arrangement 12. The crank assembly 2 includes the front sprocket 2D as a single sprocket in the illustrated embodiment. However, the crank assembly 2 can include a plurality of front sprockets. The bicycle sprocket arrangement 12 is a rear sprocket arrangement. However, structures of the bicycle sprocket arrangement 12 can be applied to a front sprocket arrangement.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle of the bicycle 10 with facing a handlebar. Accordingly, these terms, as utilized to describe the bicycle sprocket arrangement 12, should be interpreted relative to the bicycle 10 equipped with the bicycle sprocket arrangement 12 as used in an upright riding position on a horizontal surface.

Figure 2:
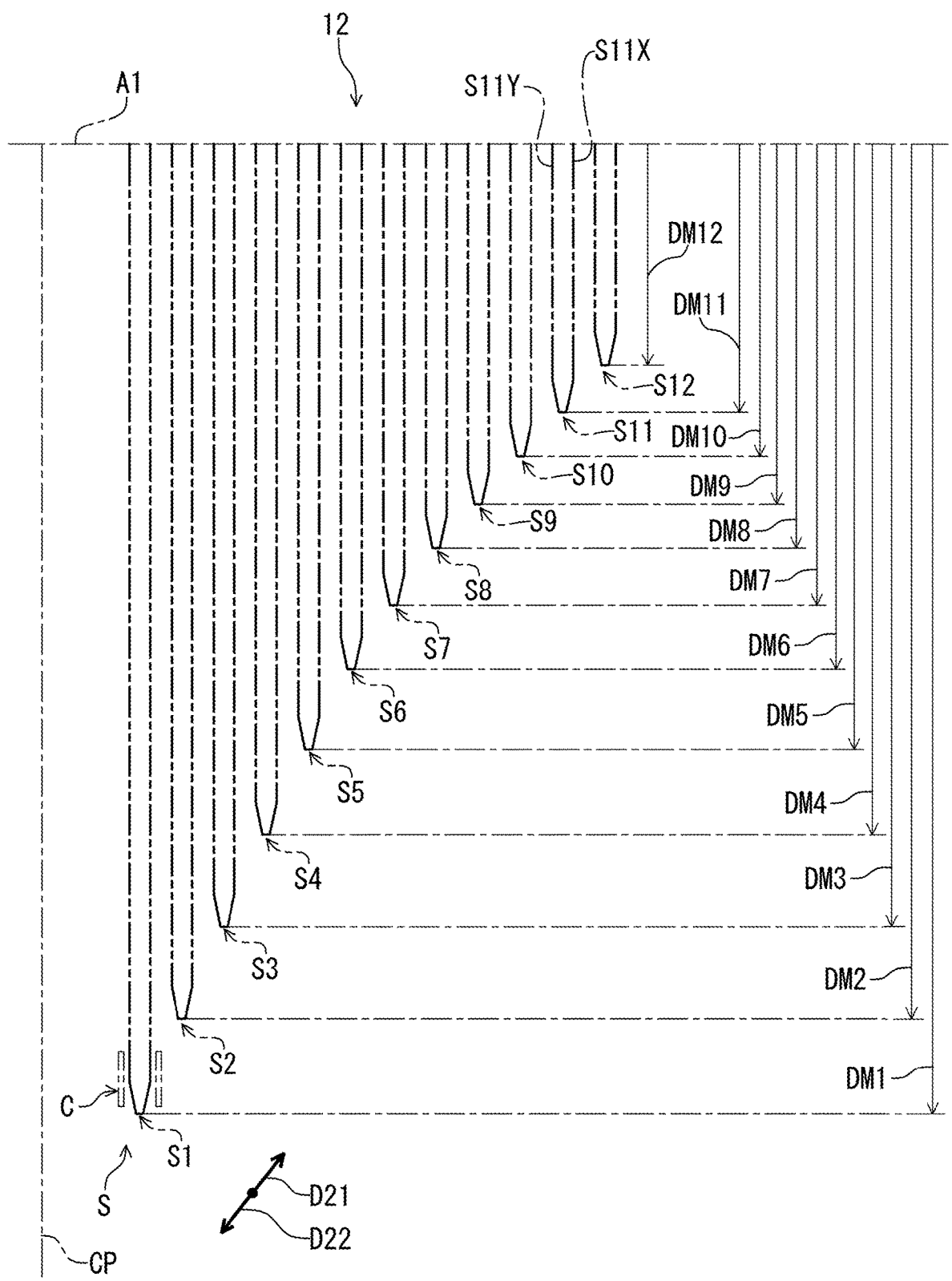
FIG. 2 is a partial rear view of the bicycle sprocket arrangement of the bicycle illustrated in FIG. 1.

As seen in FIG. 2, the bicycle sprocket arrangement 12 comprises a plurality of bicycle sprockets S. In this embodiment, the plurality of bicycle sprockets S includes bicycle sprockets S1 to S12. The bicycle sprockets S1 to S12 are arranged in this order in an axial direction D1 with respect to the rotational center axis A1 of the bicycle sprocket arrangement 12. However, the total number of the plurality of bicycle sprockets S is not limited to this embodiment.

In this embodiment, the bicycle sprocket S12 can also be referred to as a smaller sprocket S12, and the bicycle sprocket S1 can also be referred to as a larger sprocket S11. Namely, the bicycle sprocket arrangement 12 comprises the smaller sprocket S12 and the larger sprocket S11. The larger sprocket S11 is adjacent to the smaller sprocket S12 without another sprocket therebetween in the axial direction D1 with respect to the rotational center axis A1 of the bicycle sprocket arrangement 12. However, any adjacent two sprockets of the bicycle sprockets S1 to S12 can be the smaller sprocket S12 and the larger sprocket S11.

For example, upshifting occurs when the bicycle chain C is shifted from a sprocket to a neighboring smaller sprocket in an upshifting direction D21. Downshifting occurs when the bicycle chain C is shifted from a sprocket to a neighboring larger sprocket in a downshifting direction D22.

In this embodiment, the bicycle sprockets S1 to S12 are separate members from each other. However, at least one of the bicycle sprockets S1 to S12 can be integrally provided with another of the bicycle sprockets S1 to S12 as a one-piece unitary member. The bicycle sprocket arrangement 12 can be a one-piece unitary member. Alternatively, at least one of the bicycle sprockets S1 to S12 can be integrally provided with another of the bicycle sprockets S1 to S12 by adhesive or fasteners such as rivets.

The bicycle sprocket S1 has an outer diameter DM1 having the rotational center axis A1 as a center. The bicycle sprocket S2 has an outer diameter DM2 having the rotational center axis A1 as a center. The bicycle sprocket S3 has an outer diameter DM3 having the rotational center axis A1 as a center. The bicycle sprocket S4 has an outer diameter DM4 having the rotational center axis A1 as a center. The bicycle sprocket S5 has an outer diameter DM5 having the rotational center axis A1 as a center. The bicycle sprocket S6 has an outer diameter DM6 having the rotational center axis A1 as a center. The bicycle sprocket S7 has an outer diameter DM7 having the rotational center axis A1 as a center. The bicycle sprocket S8 has an outer diameter DM8 having the rotational center axis A1 as a center. The bicycle sprocket S9 has an outer diameter DM9 having the rotational center axis A1 as a center. The bicycle sprocket S10 has an outer diameter DM10 having the rotational center axis A1 as a center. The bicycle sprocket S11 has an outer diameter DM11 having the rotational center axis A1 as a center. The bicycle sprocket S12 has an outer diameter DM12 having the rotational center axis A1 as a center.

In this embodiment, the outer diameter DM1 is the largest outer diameter in the bicycle sprocket arrangement 12. The outer diameter DM12 is the smallest outer diameter in the bicycle sprocket arrangement 12. The outer diameter DM12 of the smaller sprocket S12 is smaller than the outer diameter DM11 of the larger sprocket S11.

Figure 3:
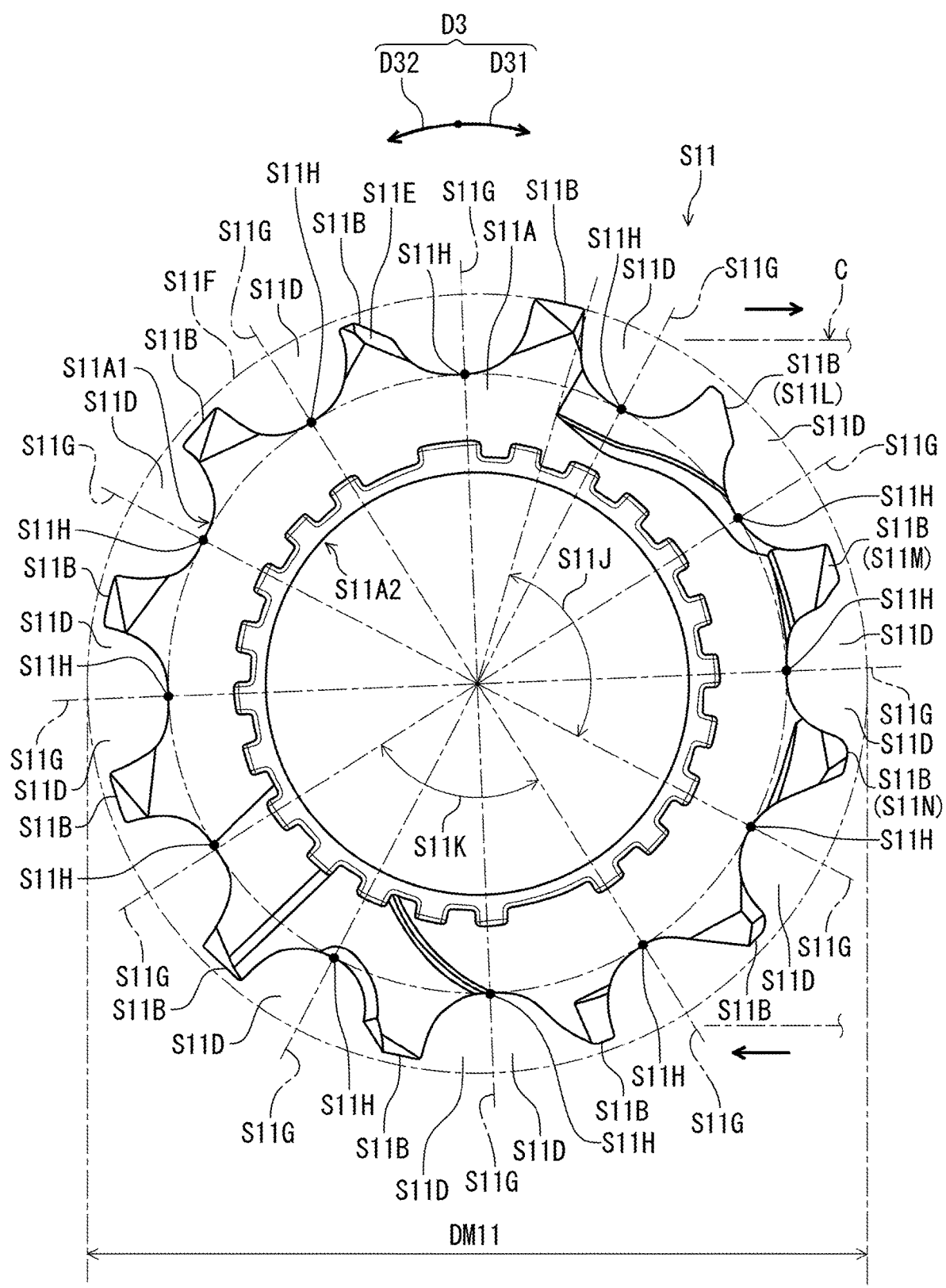
FIG. 3 is a side elevational view of a bicycle sprocket of the bicycle sprocket arrangement illustrated in FIG. 2.

As seen in FIG. 3, the bicycle sprocket S11 comprises a sprocket body S11A and a plurality of sprocket teeth S11B. The plurality of sprocket teeth S11B extends radially outwardly from the sprocket body S11A with respect to the rotational center axis A1 of the bicycle sprocket S11. The sprocket body S11A has an outer periphery S11A1 and an inner periphery S11A2. The inner periphery S11A2 is positioned radially inwardly from the outer periphery S11A1 with respect to the rotational center axis A1 of the bicycle sprocket S11. The plurality of sprocket teeth S11B is disposed on the outer periphery S11A1 of the sprocket body S11A, and extends radially outwardly from the outer periphery S11A1 of the sprocket body S11A. The outer diameter DM11 is defined by at least one tooth of the plurality of sprocket teeth S11B with respect to the rotational center axis A1.

The larger sprocket S11 of the bicycle sprocket arrangement 12 is rotated about the rotational center axis A1 in a driving rotational direction D31 during pedaling. The driving rotational direction D31 is defined along a circumferential direction D3 with respect to the rotational center axis A1 of the bicycle sprocket arrangement 12. A reverse rotational direction D32 is an opposite direction of the driving rotational direction D31 and is defined along the circumferential direction D3.

For example, the larger sprocket S11 includes a plurality of tooth-spaces S11D. The plurality of tooth-spaces S11D is provided radially outwardly of the sprocket body S11A and arranged at an equal pitch in the circumferential direction D3. The sprocket teeth S11B are respectively disposed in the tooth-spaces S11D when viewed along the rotational center axis A1.

The tooth-space S11D is defined by a root circle S11E, an outer diameter circle S11F, and adjacent two radial lines S11G as viewed along the rotational center axis A1. The root circle S11E is defined by a plurality of tooth bottoms S11H provided on the outer periphery S11A1. The outer diameter circle S11F has the outer diameter DM11. The radial line S11G extends radially outwardly from the rotational center axis A1 through the tooth bottom S11H. Each of the plurality of tooth-space S11D has the same shape.

In this embodiment, the larger sprocket S11 has a larger total tooth-space number. The larger total tooth-space number is a total number of the tooth-spaces S11D of the larger sprocket S11. The larger total tooth-space number of the larger sprocket S11 is 12, and the total number of the sprocket teeth S11B is 12. Namely, the larger total tooth-space number is equal to the total number of the sprocket teeth S11B in the larger sprocket S11. However, the larger total tooth-space number can be different from the total number of the sprocket teeth S11B in the larger sprocket S11. For example, at least one of the sprocket teeth S11B can be omitted from the larger sprocket S11. In such embodiments, the total number of the plurality of sprocket teeth S11B decreases while the largest total tooth-space number is constant.

Figure 4:
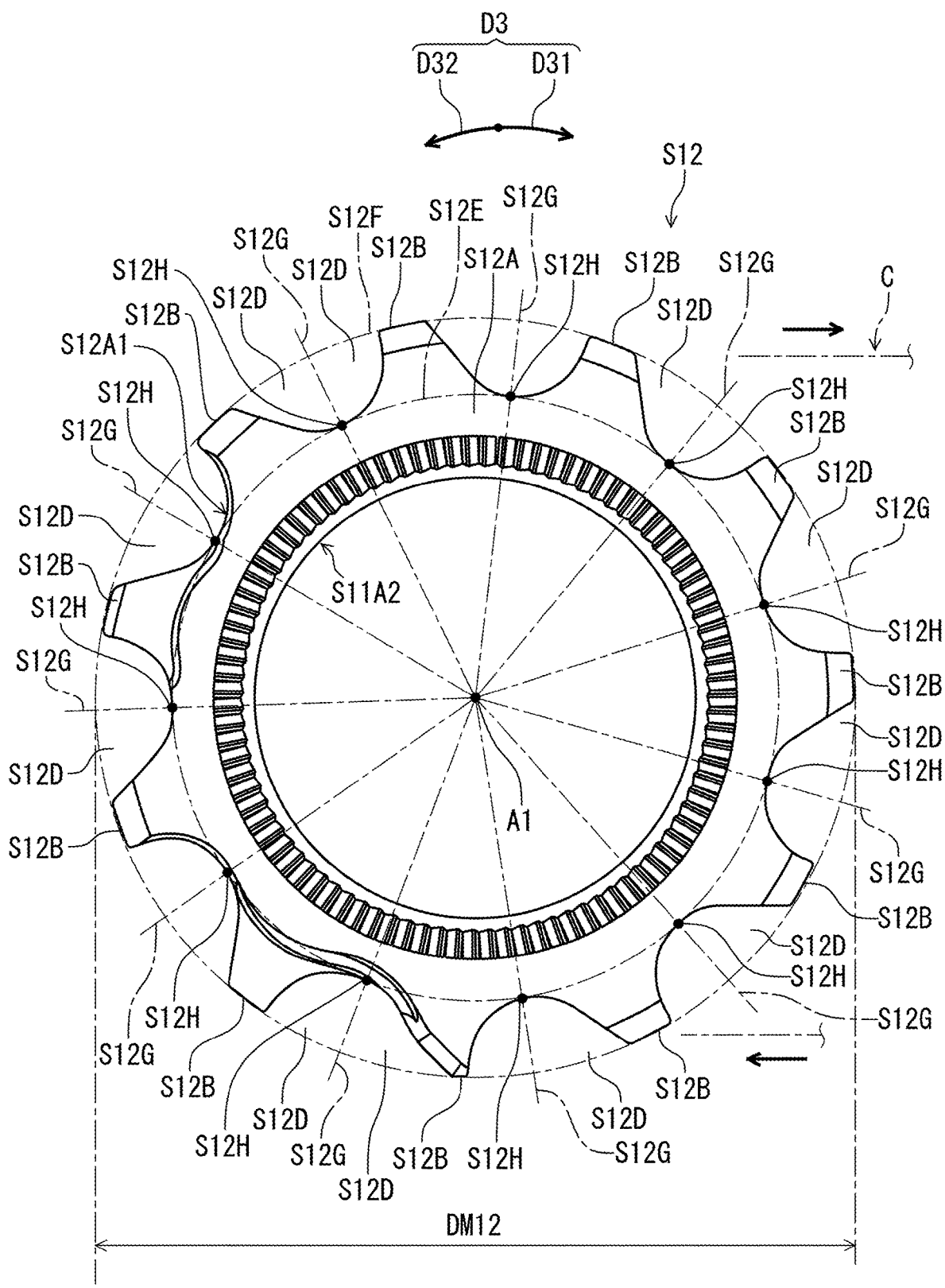
FIG. 4 is a side elevational view of another bicycle sprocket of the bicycle sprocket arrangement illustrated in FIG. 2.

As seen in FIG. 4, the bicycle sprocket S12 comprises a sprocket body S12A and a plurality of sprocket teeth S12B. The plurality of sprocket teeth S12B extends radially outwardly from the sprocket body S12A with respect to the rotational center axis A1 of the bicycle sprocket S12. The sprocket body S12A has an outer periphery S12A1 and an inner periphery S12A2. The inner periphery S12A2 is positioned radially inwardly from the outer periphery S12A1 with respect to the rotational center axis A1 of the bicycle sprocket S12. The plurality of sprocket teeth S12B is disposed on the outer periphery S12A1 of the sprocket body S12A, and extends radially outwardly from the outer periphery S12A1 of the sprocket body S12A. The outer diameter DM12 is defined by at least one tooth of the plurality of sprocket teeth S12B with respect to the rotational center axis A1.

For example, the smaller sprocket S12 includes a plurality of tooth-spaces S12D. The plurality of tooth-spaces S12D is provided radially outwardly of the sprocket body S12A and arranged at an equal pitch in the circumferential direction D3. The sprocket teeth S12B are respectively disposed in the tooth-spaces S12D.

The tooth-space S12D is defined by a root circle S12E, an outer diameter circle S12F, and adjacent two radial lines S12G as viewed along the rotational center axis A1. The root circle S12E is defined by a plurality of tooth bottoms S12H provided on the outer periphery S12A1. The outer diameter circle S12F has the outer diameter DM12. The radial line S12G extends radially outwardly from the rotational center axis A1 through the tooth bottom S12H. Each of the plurality of tooth-space S12D has the same shape.

In this embodiment, the smaller sprocket S12 has a smaller total tooth-space number. The larger total tooth-space number is larger than the smaller total tooth-space number by one. The smaller total tooth-space number is a total number of the tooth-spaces of the smaller sprocket S12. The smaller total tooth-space number of the smaller sprocket S12 is 11, and the total number of the sprocket teeth is 11. Namely, the smaller total tooth-space number is equal to the total number of the sprocket teeth in the smaller sprocket S12. However, the smaller total tooth-space number can be different from the total number of the sprocket teeth in the smaller sprocket S12. For example, at least one of the sprocket teeth S12B can be omitted from the smaller sprocket S12. In such embodiments, the total number of the plurality of sprocket teeth S12B decreases while the largest total tooth-space number is constant.

As seen in FIG. 3, the larger sprocket S11 has at least one upshifting facilitation area S11J configured to facilitate an upshifting operation in which the bicycle chain C is shifted from the larger sprocket S11 toward the smaller sprocket S12 (see, e.g., FIG. 2). A derailleur shifts the bicycle chain C toward the smaller sprocket S12 (see, e.g., FIG. 2) to start the upshifting operation. The at least one upshifting facilitation area S11J includes an upstream tooth S11L, an intermediate tooth S11M, and a downstream tooth S11N. The plurality of sprocket teeth S11B includes the upstream tooth S11L, the intermediate tooth S11M, and the downstream tooth S11N. In this embodiment, the larger sprocket S11 has the upshifting facilitation area S11J including the upstream, intermediate and downstream teeth S11L, S11M and S11N. However, a total number of the at least one upshifting facilitation area S11J is not limited to this embodiment.

The larger sprocket S11 has at least one downshifting facilitation area S11K configured to facilitate a downshifting operation in which the bicycle chain C is shifted from the smaller sprocket S12 (see, e.g., FIG. 2) toward the larger sprocket S11. In this embodiment, the larger sprocket S11 has the downshifting facilitation area S11K. However, a total number of the at least one downshifting facilitation area S11K is not limited to this embodiment. The downshifting facilitation area S11K can be omitted from the larger sprocket S11.

Figure 5:
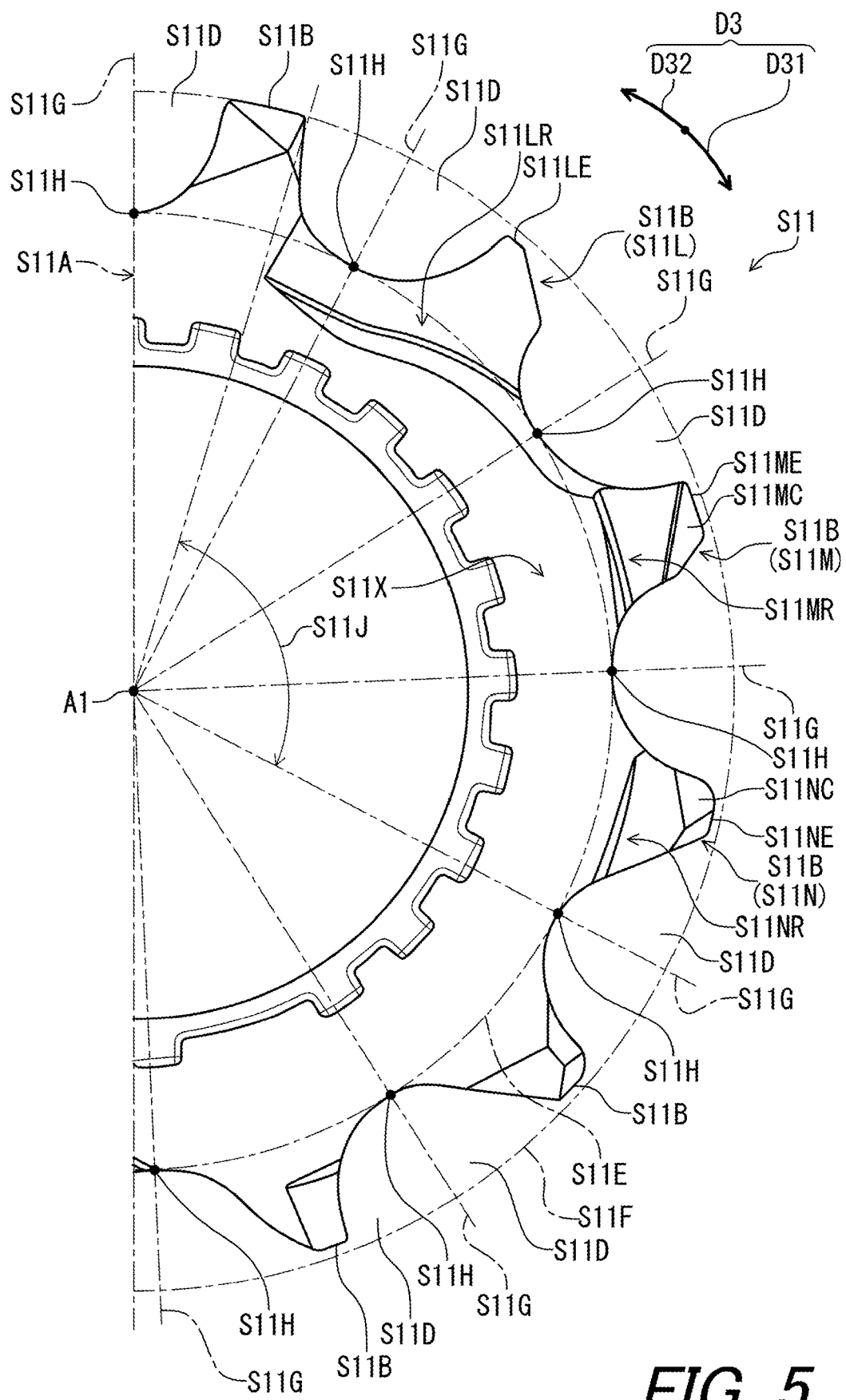
FIG. 5 is a partial side elevational view of the bicycle sprocket illustrated in FIG. 3.

As seen in FIG. 5, the intermediate tooth S11M is adjacent to the upstream tooth S11L without another tooth therebetween in the circumferential direction D3 with respect to the rotational center axis A1. The intermediate tooth S11M is provided on a downstream side of the upstream tooth S11L in the circumferential direction D3. The downstream tooth S11N is adjacent to the intermediate tooth S11M without another tooth therebetween in the circumferential direction D3. The downstream tooth S11N is provided on a downstream side of the intermediate tooth S11M in the circumferential direction D3. The intermediate tooth S11M is disposed between the upstream tooth S11L and the downstream tooth S11N in the circumferential direction D3.

Figure 6:
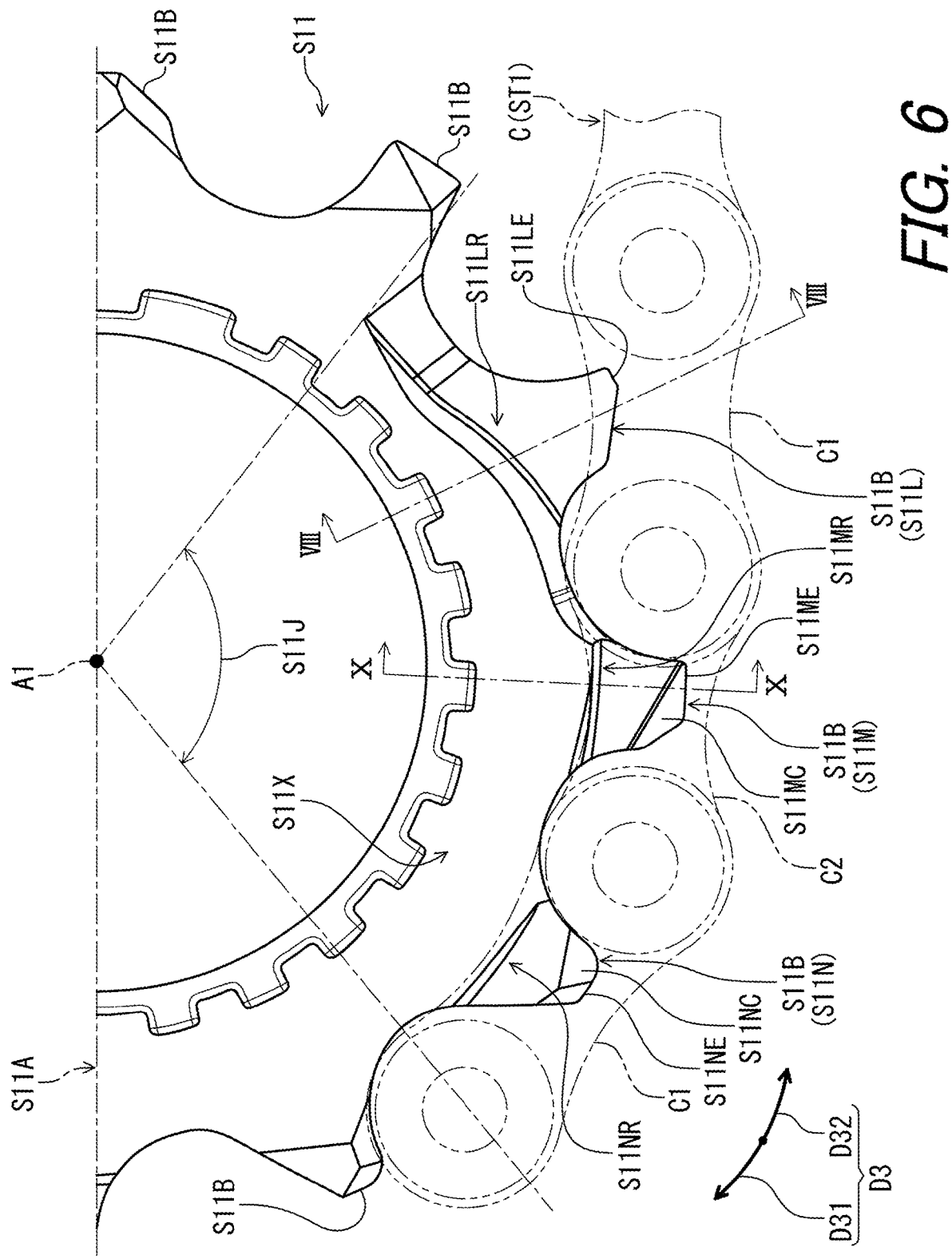
FIG. 6 is a partial side elevational view of the bicycle sprocket illustrated in FIG. 3, with a chain engaged with the bicycle sprocket (first chain-phase state).

As seen in FIG. 6, the larger sprocket S11 has a first chain-phase state ST1 in which the downstream tooth S11N is engaged with a pair of opposed outer link plates C1 of the bicycle chain C. The upshifting operation includes a first upshifting operation corresponding to the first chain-phase state ST1. The upshifting facilitation area S11J is configured to facilitate the first upshifting operation in which the bicycle chain C is shifted from the larger sprocket S11 toward the smaller sprocket S12 (see, e.g., FIG. 2) in the first chain-phase state ST1.

Figure 7:
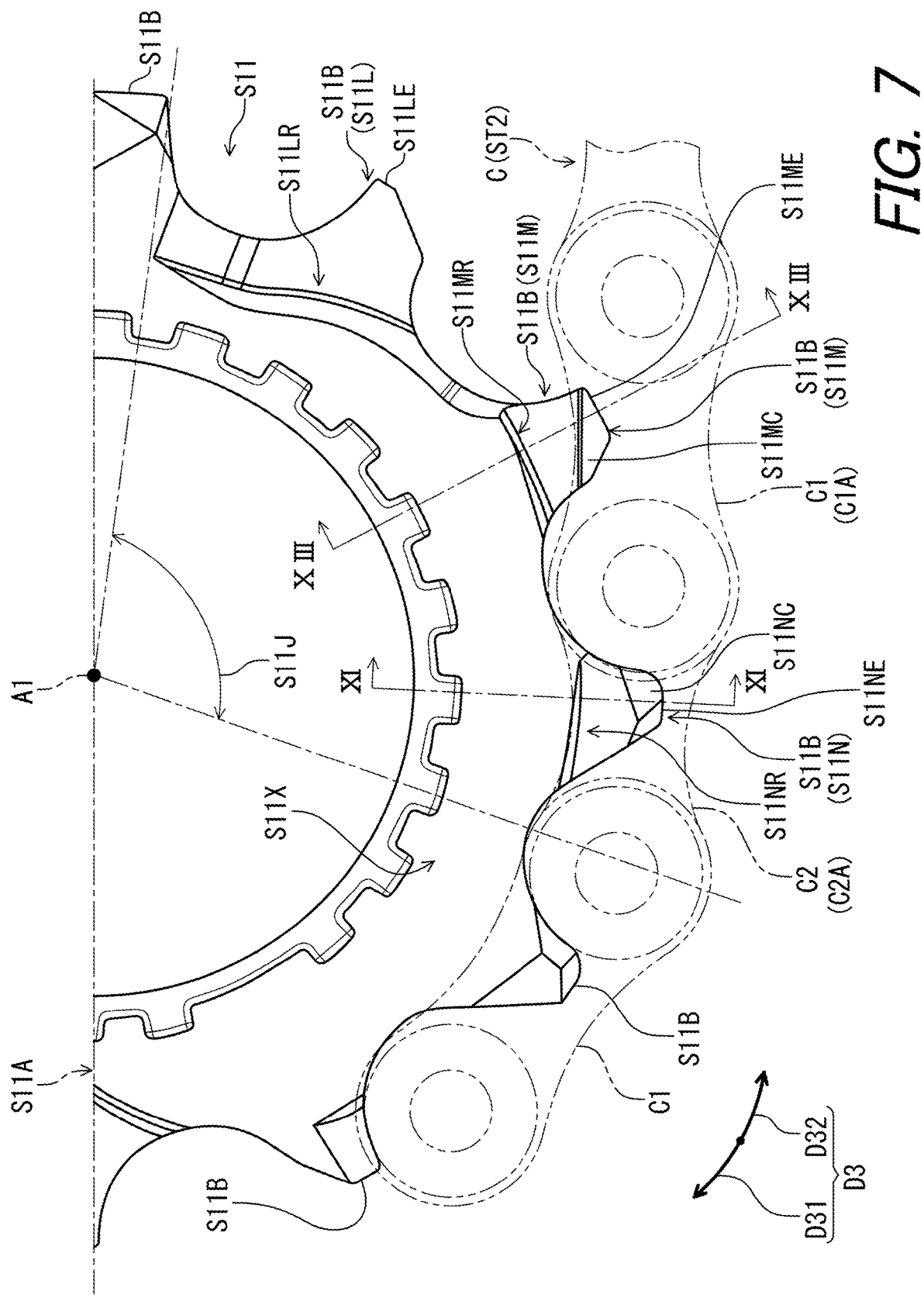
FIG. 7 is a partial side elevational view of the bicycle sprocket illustrated in FIG. 3, with the chain engaged with the bicycle sprocket (second chain-phase state).

As seen in FIG. 7, the larger sprocket S11 has a second chain-phase state ST2 in which the downstream tooth S11N is engaged with a pair of opposed inner link plates C2 of the bicycle chain C. The upshifting operation includes a second upshifting operation corresponding to the second chain-phase state ST2. The upshifting facilitation area S11J is configured to facilitate the second upshifting operation in which the bicycle chain C is shifted from the larger sprocket S11 toward the smaller sprocket S12 (see, e.g., FIG. 2) in the second chain-phase state ST2.

Figure 8:
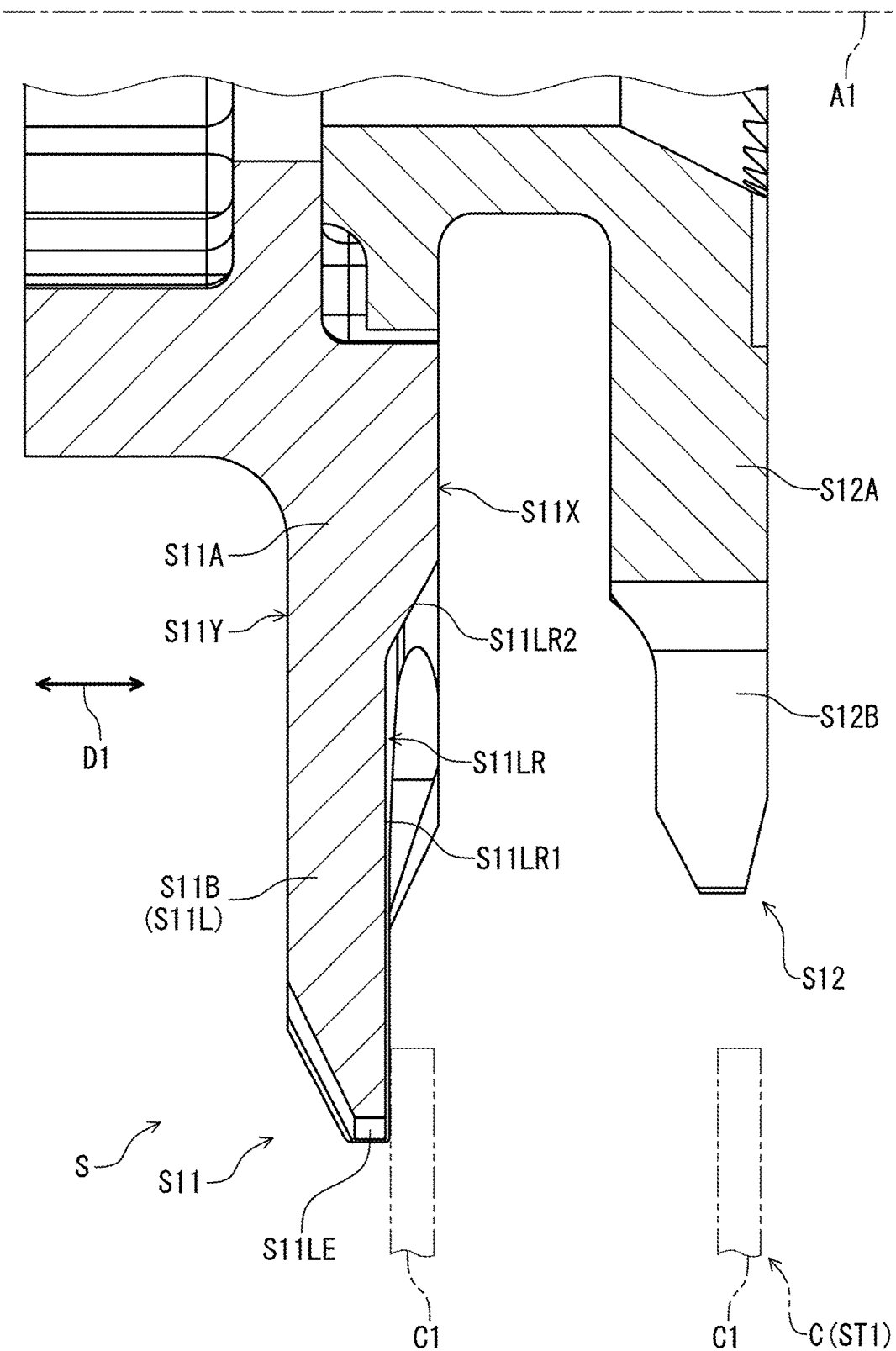
FIG. 8 is a partial cross-sectional view of the bicycle sprocket arrangement taken along line VIII-VIII of FIG. 6.

As seen in FIG. 8, the upstream tooth S11L has a first recessed portion S11LR. The first recessed portion S11LR of the upstream tooth S11L is configured to facilitate initial disengagement of the pair of opposed outer link plates C1 of the bicycle chain C from the upstream tooth S11L toward the smaller sprocket S12 in the upshifting operation. The first recessed portion S11LR of the upstream tooth S11L is configured to facilitate initial disengagement of the pair of opposed outer link plates C1 of the bicycle chain C from the upstream tooth S11L toward the smaller sprocket S12 in the first upshifting operation.

The bicycle sprocket S11 has a first axially-facing surface S11X and a second-axially facing surface S11Y. The second-axially facing surface S11Y is provided on a reverse side of the bicycle sprocket S11 relative to the first axially-facing surface S11X in the axial direction D1 with respect to the rotational center axis A1. The first axially-facing surface S11X faces toward the smaller sprocket S12. In this embodiment, the first recessed portion S11LR is provided on the first axially-facing surface S11X.

As seen in FIG. 2, the first axially-facing surface S11X faces axially outwardly in the axial direction D1 with respect to a center plane CP of the bicycle frame BF (see, e.g., FIG. 1) in a mounting state where the bicycle sprocket S11 is mounted to the bicycle frame BF (see, e.g., FIG. 1). The second axially-facing surface S11Y faces axially inwardly in the axial direction D1 toward the center plane CP of the bicycle frame BF in the mounting state.

Figure 9:
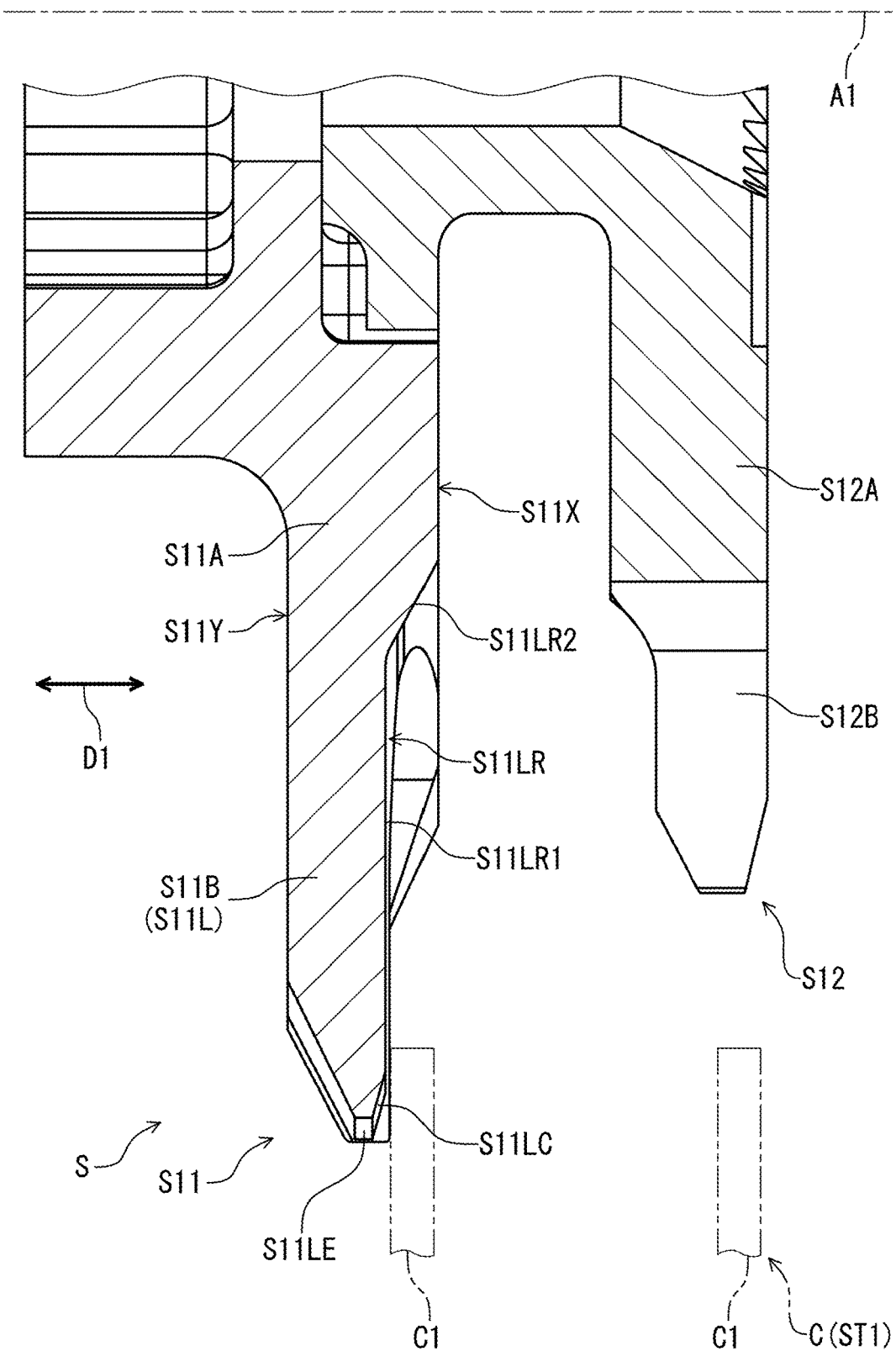
FIG. 9 is a partial cross-sectional view of a bicycle sprocket arrangement in accordance with a modified example.

As seen in FIG. 8, the upstream tooth S11L is free of a chamfered portion provided to at least a radially outermost end S11LE of the upstream tooth S11L. As seen in FIG. 9, however, the upstream tooth S11L can have a chamfered portion S11LC provided to at least the radially outermost end S11LE of the upstream tooth S11L. In such modification, for example, the chamfered portion S11LC of the upstream tooth S11L is inclined from the radially outermost end S11LE of the upstream tooth S11L toward the smaller sprocket S12 with respect to the rotational center axis A1. The chamfered portion S11LC of the upstream tooth S11L is provided on the first axially-facing surface S11X. However, the structure of chamfered portion S11L C of the upstream tooth S11L is not limited to this modification.

Figure 10:
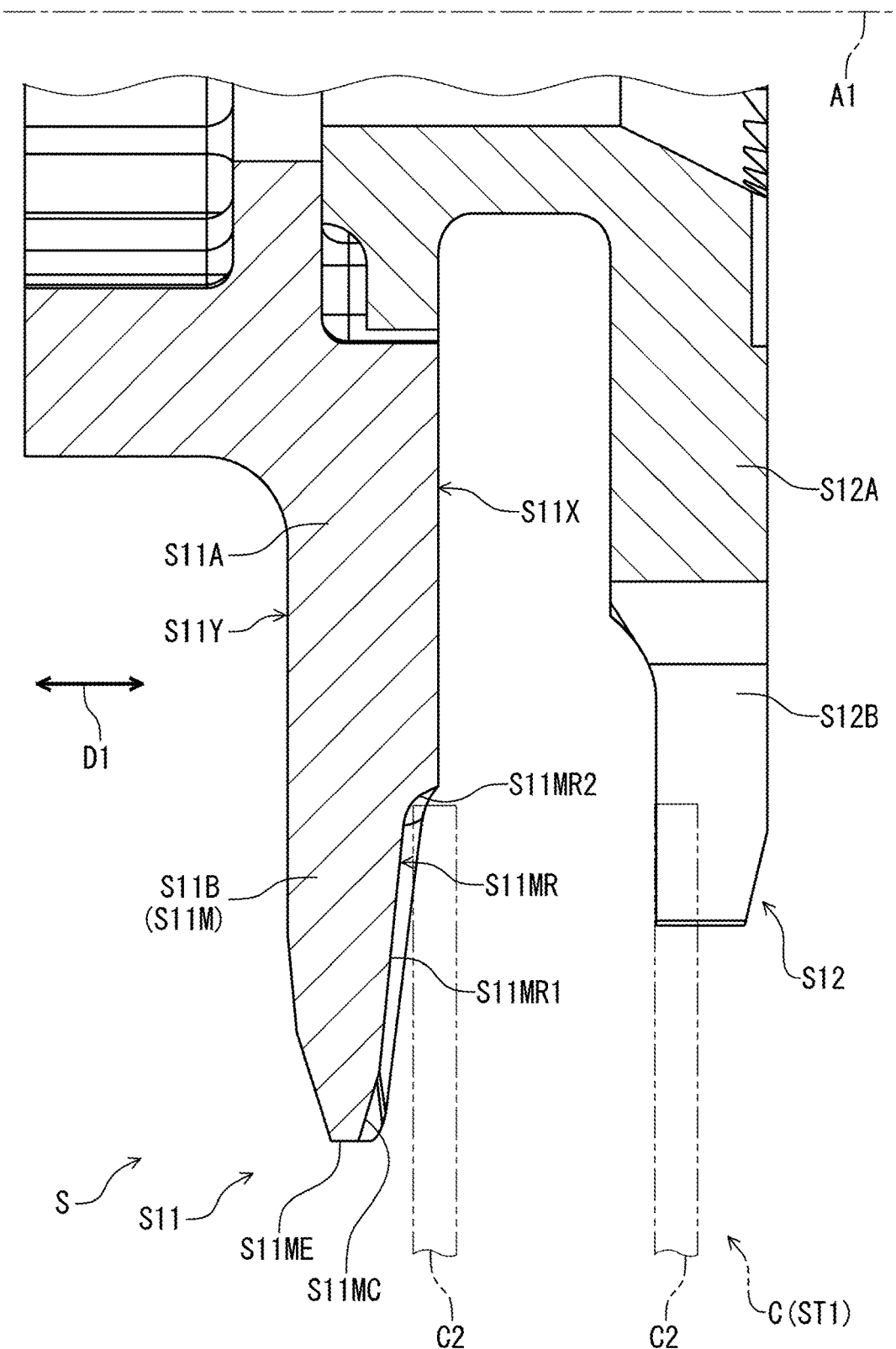
FIG. 10 is a partial cross-sectional view of the bicycle sprocket arrangement taken along line X-X of FIG. 6.

As seen in FIG. 10, the intermediate tooth S11M has a second recessed portion S11MR. The second recessed portion S11MR is provided on the first axially-facing surface S11X. The second recessed portion S11MR of the intermediate tooth S11M is configured to facilitate initial disengagement of the pair of opposed inner link plates C2 of the bicycle chain C from the intermediate tooth S11M toward the smaller sprocket S12 in the upshifting operation. In this embodiment, the second recessed portion S11MR of the intermediate tooth S11M is configured to facilitate initial disengagement of the pair of opposed inner link plates C2 of the bicycle chain C from the intermediate tooth S11M toward the smaller sprocket S12 in the first upshifting operation.

The intermediate tooth S11M has a chamfered portion S11MC provided to at least a radially outermost end S11ME of the intermediate tooth S11M. The chamfered portion S11MC of the intermediate tooth S11M is inclined from the radially outermost end S11ME of the intermediate tooth S11M toward the smaller sprocket S12 with respect to the rotational center axis A1. The chamfered portion S11MC of the intermediate tooth S11M is provided on the first axially-facing surface S11X. However, the position of the chamfered portion S11MC of the intermediate tooth S11M is not limited to this embodiment. The chamfered portion S11MC of the intermediate tooth S11M can be omitted from the intermediate tooth S11M.

Figure 11:
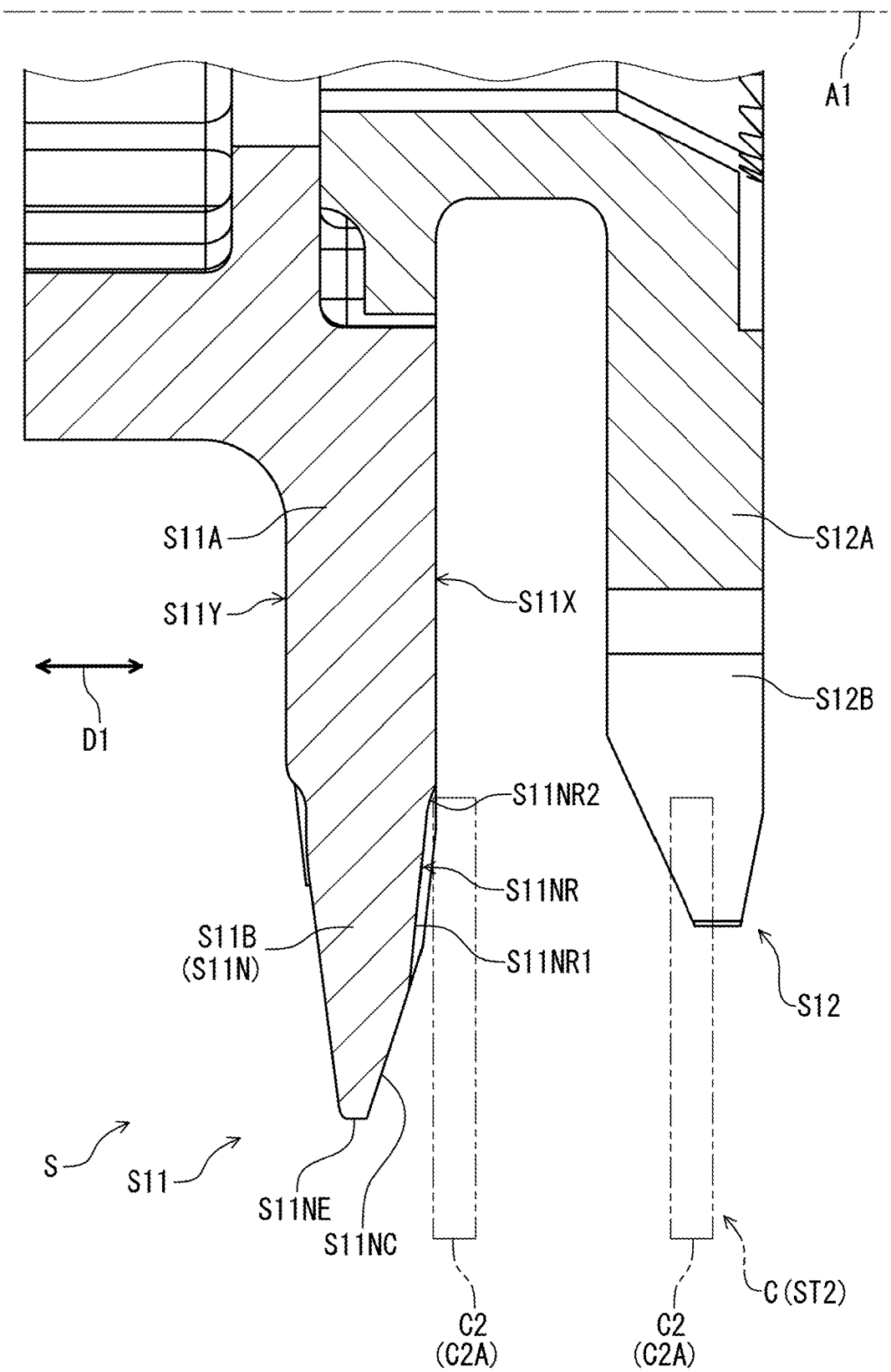
FIG. 11 is a partial cross-sectional view of the bicycle sprocket arrangement taken along line XI-XI of FIG. 7.

As seen in FIG. 11, the downstream tooth S11N has at least one of a third recessed portion and a chamfered portion. The at least one of the third recessed portion and the chamfered portion of the downstream tooth S11N is configured to facilitate initial disengagement of a pair of opposed inner link plates C2 of the bicycle chain C from the downstream tooth S11N toward the smaller sprocket S12 in the upshifting operation.

In this embodiment, the downstream tooth S11N has a third recessed portion S11NR. The downstream tooth S11N has the chamfered portion S11NC. The third recessed portion S11NR and the chamfered portion S11NC are provided on the first axially-facing surface S11X. The third recessed portion S11NR and the chamfered portion S11NC of the downstream tooth S11N are configured to facilitate initial disengagement of the pair of opposed inner link plates C2 of the bicycle chain C from the downstream tooth S11N toward the smaller sprocket S12 in the second upshifting operation.

Figure 12:
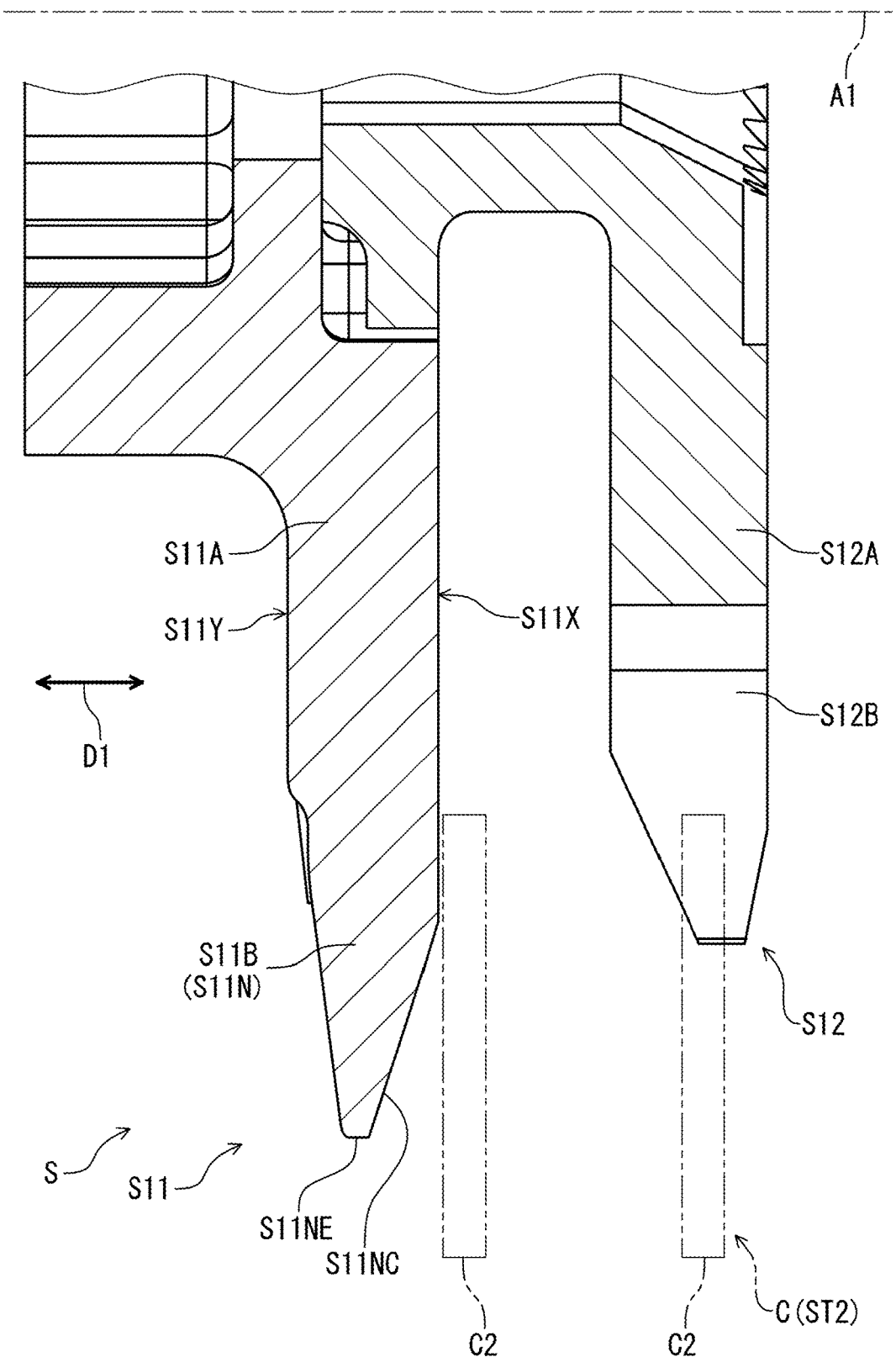
FIG. 12 is a partial cross-sectional view of the bicycle sprocket arrangement in accordance with a modified example.

The chamfered portion S11NC of the downstream tooth S11N is provided to at least a radially outermost end S11NE of the downstream tooth S11N. The chamfered portion S11NC of the downstream tooth S11N is provided on the first axially-facing surface S11X. The chamfered portion S11NC of the downstream tooth S11N is inclined from the radially outermost end S11NE of the downstream tooth S11N toward the smaller sprocket S12 with respect to the rotational center axis A1. However, the structure of chamfered portion S11NC of the downstream tooth S11N is not limited to this embodiment. At least one of the third recessed portion S11NR and the chamfered portion S11NC is omitted from the downstream tooth S11N. As seen in FIG. 12, the downstream tooth S11N can be free of the third recessed portion S11NR.

Figure 13:
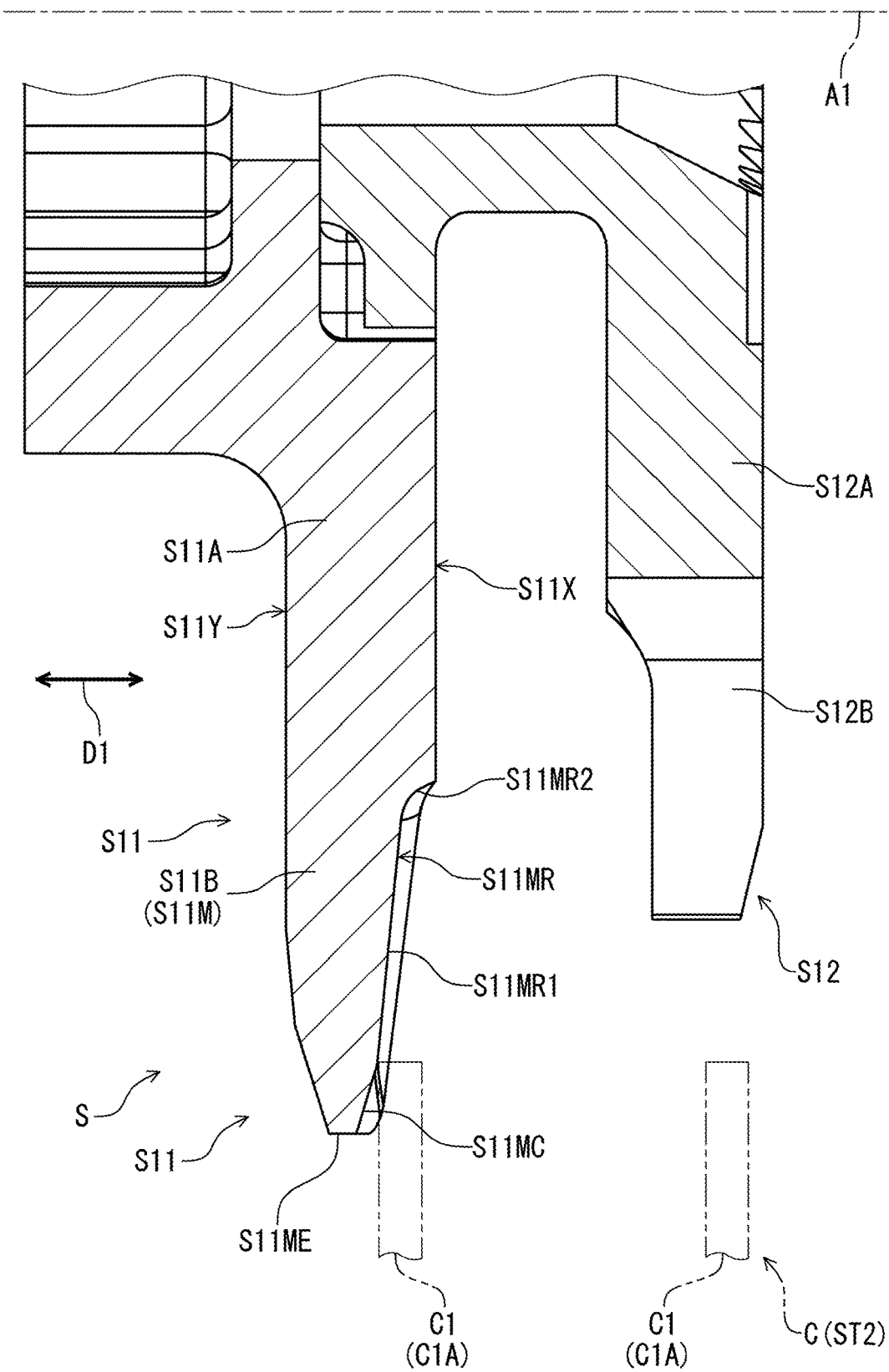
FIG. 13 is a partial cross-sectional view of the bicycle sprocket arrangement taken along line XIII-XIII of FIG. 7.

As seen in FIGS. 7 and 13, the second recessed portion S11MR of the intermediate tooth S11M is configured to facilitate initial disengagement of the pair of opposed outer link plates CIA of the bicycle chain C from the intermediate tooth S11M toward the smaller sprocket S12 in the upshifting operation if the at least one of the third recessed portion S11NR and the chamfered portion S11NC of the downstream tooth S11N facilitates initial disengagement of the pair of opposed inner link plates C2A of the bicycle chain C from the downstream tooth S11N toward the smaller sprocket S12 in the upshifting operation. The second recessed portion S11MR of the intermediate tooth S11M is configured to facilitate initial disengagement of the pair of opposed outer link plates CIA of the bicycle chain C from the intermediate tooth S11M toward the smaller sprocket S12 in the second upshifting operation if the at least one of the third recessed portion S11NR and the chamfered portion S11NC of the downstream tooth S11N facilitates initial disengagement of the pair of opposed inner link plates C2A of the bicycle chain C from the downstream tooth S11N toward the smaller sprocket S12 in the second upshifting operation. The pair of opposed outer link plates CIA is adjacent to the pair of opposed inner link plates C2A without another pair of opposed inner or outer link plates of the bicycle chain C.

Figure 14:
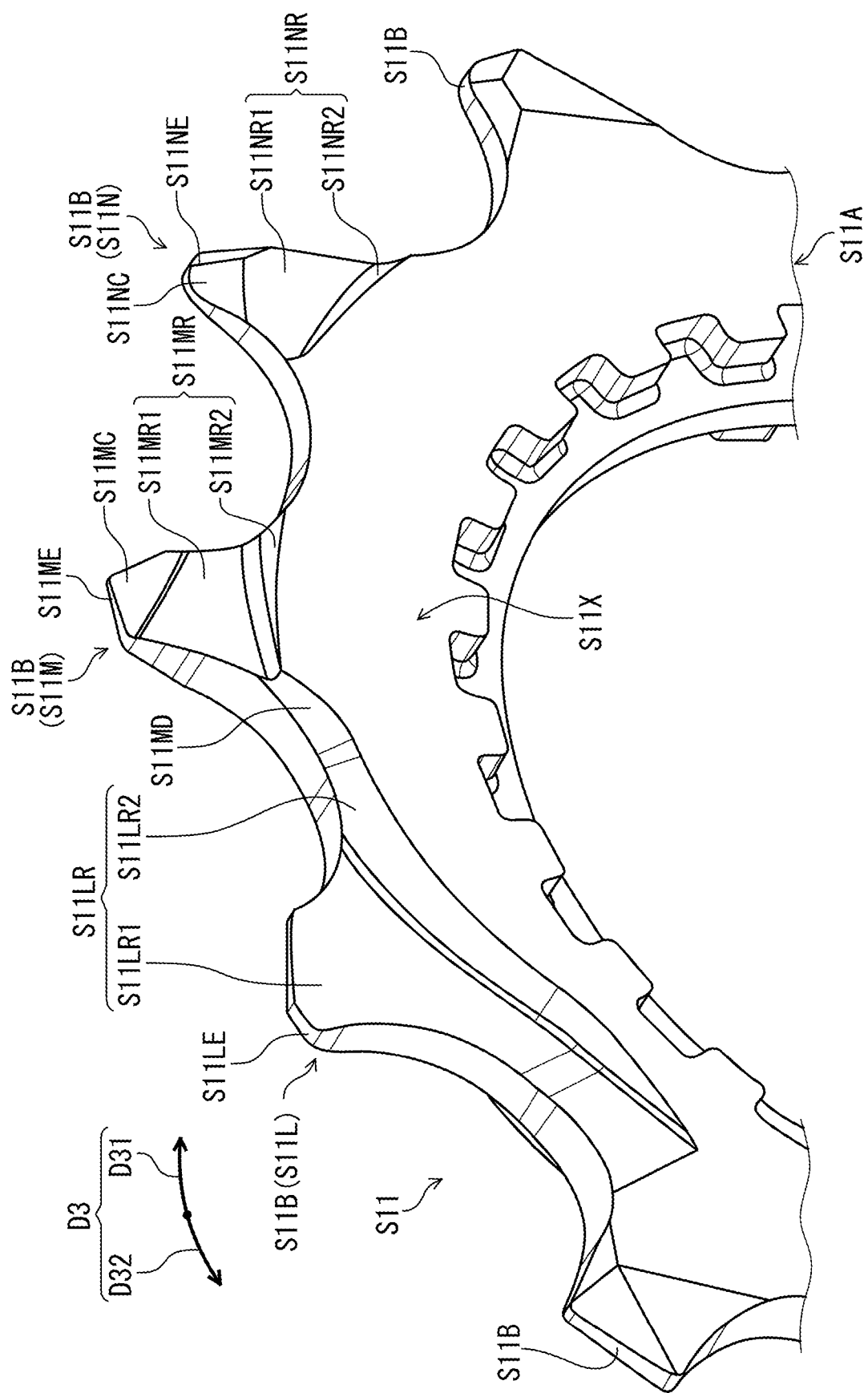
FIG. 14 is a partial perspective view of the bicycle sprocket illustrated in FIG. 3.

As seen in FIG. 14, the first recessed portion S11LR includes a first receiving surface S11LR1 and a first inclined surface S11LR2. As seen in FIG. 8, the first receiving surface S11LR1 faces in the axial direction D1 and is provided on the first axially-facing surface S11X. The first inclined surface S11LR2 is provided between the first receiving surface S11LR1 and the rotational center axis A1. The first inclined surface S11LR2 is inclined relative to the rotational center axis A1 and extends from the first receiving surface S11LR1 toward the smaller sprocket S12.

As seen in FIG. 14, the second recessed portion S11MR includes a second receiving surface S11MR1 and a second inclined surface S11MR2. As seen in FIG. 10, the second receiving surface S11MR1 faces in the axial direction D1 and is provided on the second axial side S11X. The second inclined surface S11MR2 is provided between the second receiving surface S11MR1 and the rotational center axis A1.

The second inclined surface S11MR2 is inclined relative to the rotational center axis A1 and extends from the second receiving surface S11MR1 toward the smaller sprocket S12.

As seen in FIG. 14, the second recessed portion S11MR is separated from the first recessed portion S11LR. The second receiving surface S11MR1 is separated from the first receiving surface S11LR1 and is spaced apart from the first receiving surface S11LR1 in the circumferential direction D3. The intermediate tooth S11M includes a chamfer S11MD. The chamfer S11MD is provided between the first recessed portion S11LR and the second recessed portion S11MR in the circumferential direction D3. However, the second recessed portion S11MR can be continuously connected to the first recessed portion S11LR.

The third recessed portion S11NR includes a third receiving surface S11NR1 and a third inclined surface S11NR2. As seen in FIG. 11, the third receiving surface S11NR1 faces in the axial direction D1 and is provided on the third axial side S11X. The third inclined surface S11NR2 is provided between the third receiving surface S11NR1 and the rotational center axis A1. The third inclined surface S11NR2 is inclined relative to the rotational center axis A1 and extends from the third receiving surface S11NR1 toward the smaller sprocket S12.

Figure 15:
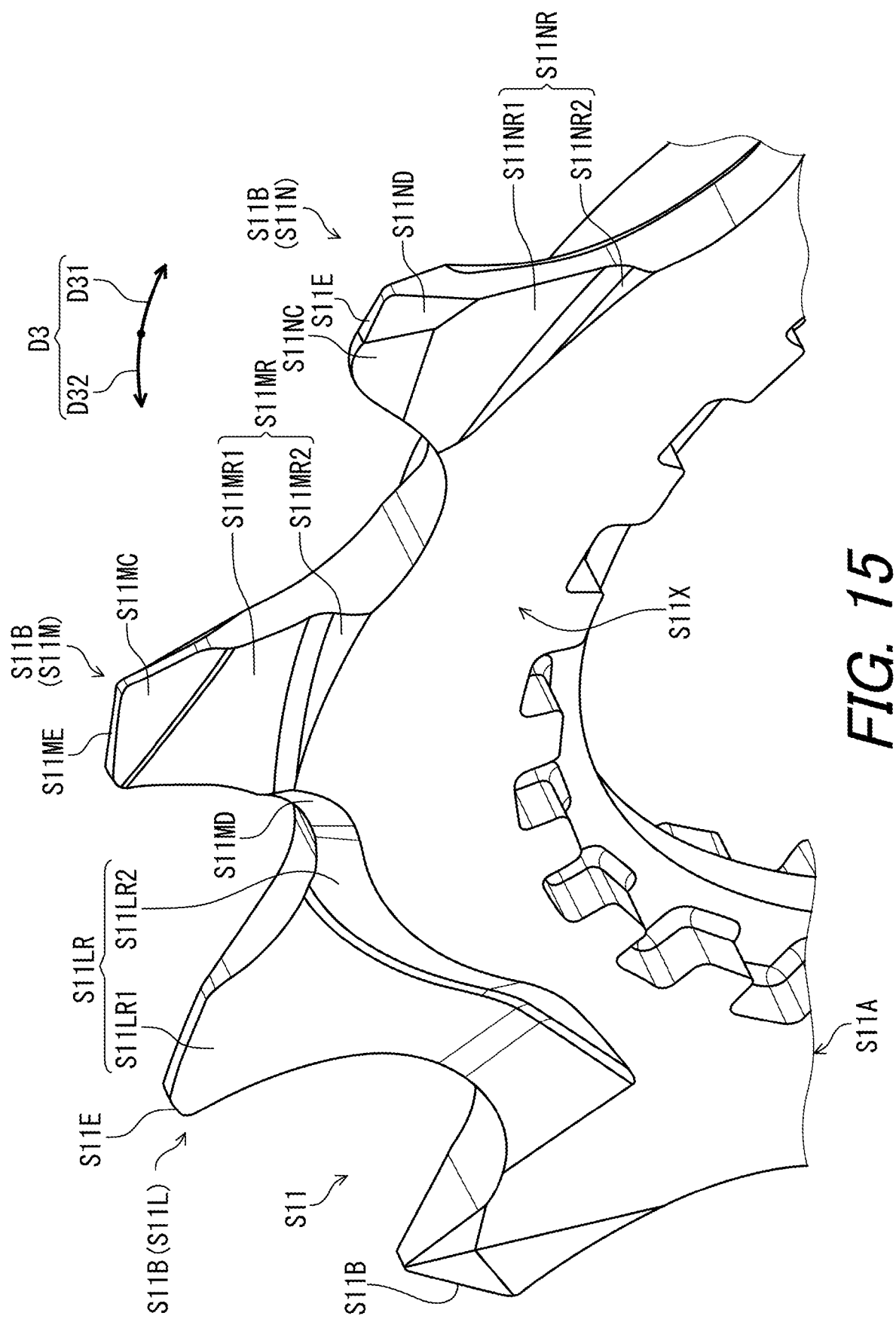
FIG. 15 is another partial perspective view of the bicycle sprocket illustrated in FIG. 16 is an enlarged partial side elevational view of an upstream tooth of the bicycle sprocket illustrated in FIG. 3.

As seen in FIG. 15, at least one of the third recessed portion S11NR and the chamfered portion S11NC is separated from the second recessed portion S11MR. In this embodiment, the third recessed portion S11NR and the chamfered portion S11NC are separated from the second recessed portion S11MR. The third receiving surface S11NR1 is separated from the second receiving surface S11MR1 and is spaced apart from the second receiving surface S11MR1 in the circumferential direction D3. The third inclined surface S11NR2 is separated from the second receiving surface S11MR1 and is spaced apart from the second receiving surface S11MR1 in the circumferential direction D3. However, at least one of the third recessed portion S11NR and the chamfered portion S11NC can be directly connected to the second recessed portion S11MR.

The downstream tooth S11N has an additional chamfered portion S11ND. The additional chamfered portion S11ND is provided on the first axially-facing surface S11X. The additional chamfered portion S11ND is provided to at least a radially outermost end S11NE of the downstream tooth S11N. The additional chamfered portion S11ND is inclined relative to the chamfered portion S11NC of the downstream tooth S11N. However, the structure of the additional chamfered portion S11ND is not limited to this embodiment. The additional chamfered portion S11ND can be omitted from the downstream tooth S11N.

Figure 16:
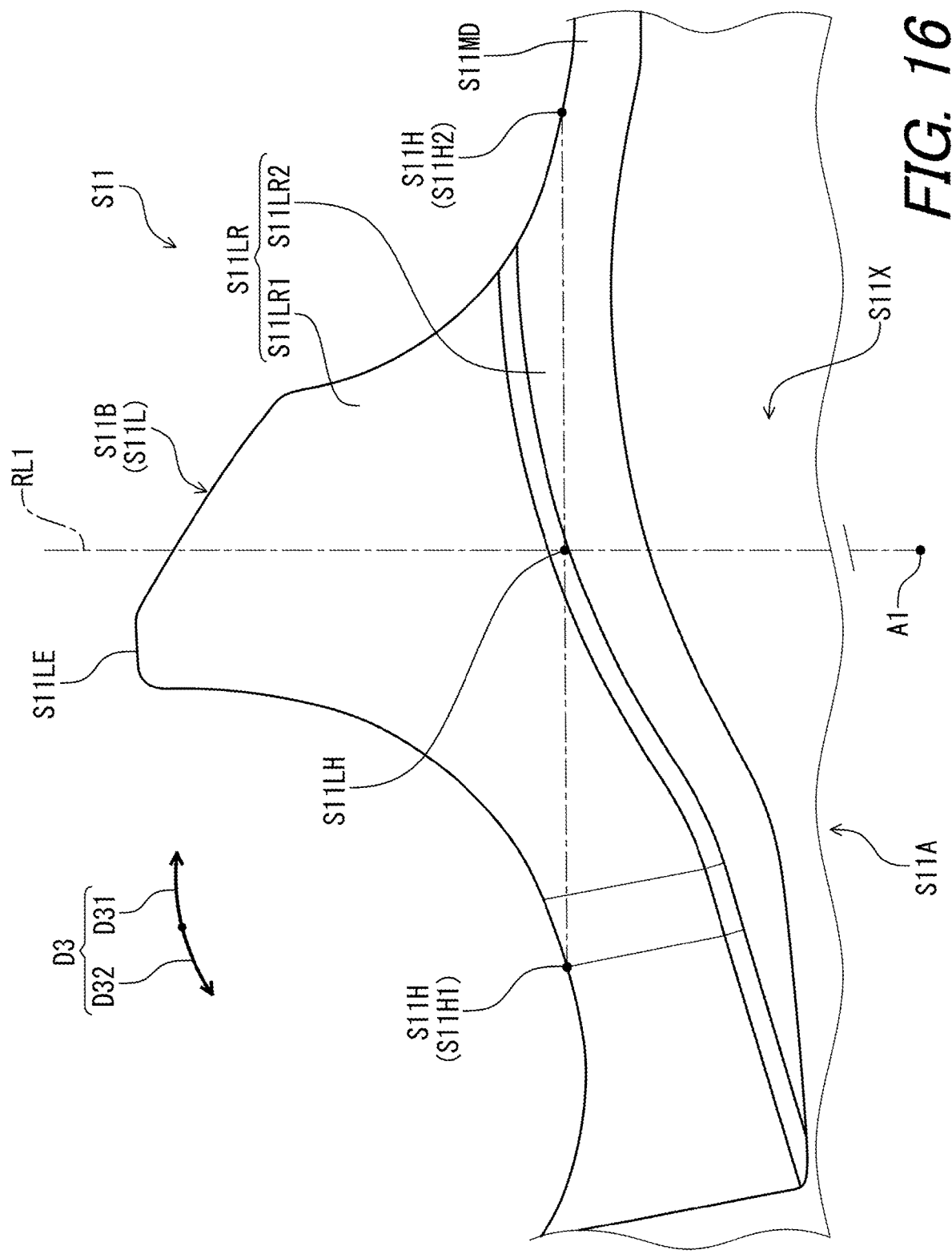

As seen in FIG. 16, the upstream tooth S11L has a first tooth-bottom center point S11LH. The first tooth-bottom center point S11LH is provided at a middle point between the adjacent two tooth bottoms S11H1 and S11H2 of the upstream tooth S11L when viewed along the rotational center axis A1. In this embodiment, the upstream tooth S11L is asymmetric with respect to a first reference line RL1 passing through the rotational center axis A1 and the first tooth-bottom center point S11LH. The upstream tooth S11L is asymmetric with respect to the first reference line RL1 passing through the rotational center axis A1 and the first tooth-bottom center point S11LH when viewed along the rotational center axis A1. However, the upstream tooth S11L can be symmetric with respect to the first reference line RL1 when viewed along the rotational center axis A1.

Figure 17:
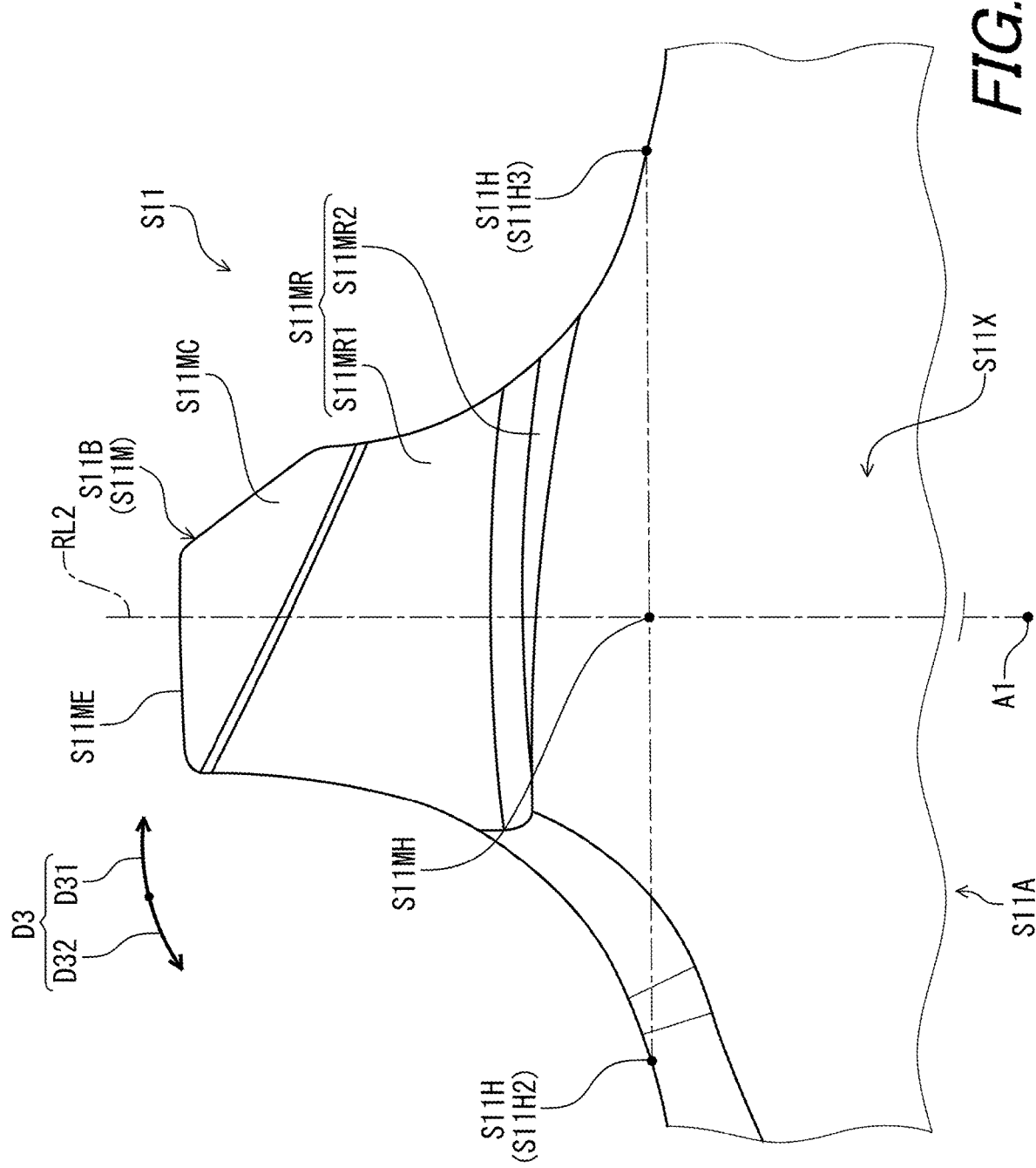
FIG. 17 is an enlarged partial side elevational view of an intermediate tooth of the bicycle sprocket illustrated in FIG. 3.

As seen in FIG. 17, the intermediate tooth S11M has a second tooth-bottom center point S11MH. The second tooth-bottom center point S11MH is provided at a middle point between the adjacent two tooth bottoms S11H2 and S11H3 of the intermediate tooth S11M when viewed along the rotational center axis A1. In this embodiment, the intermediate tooth S11M is asymmetric with respect to a second reference line RL2 passing through the rotational center axis A1 and the second tooth-bottom center point S11MH. However, the intermediate tooth S11M can be symmetric with respect to the second reference line RL2.

Figure 18:
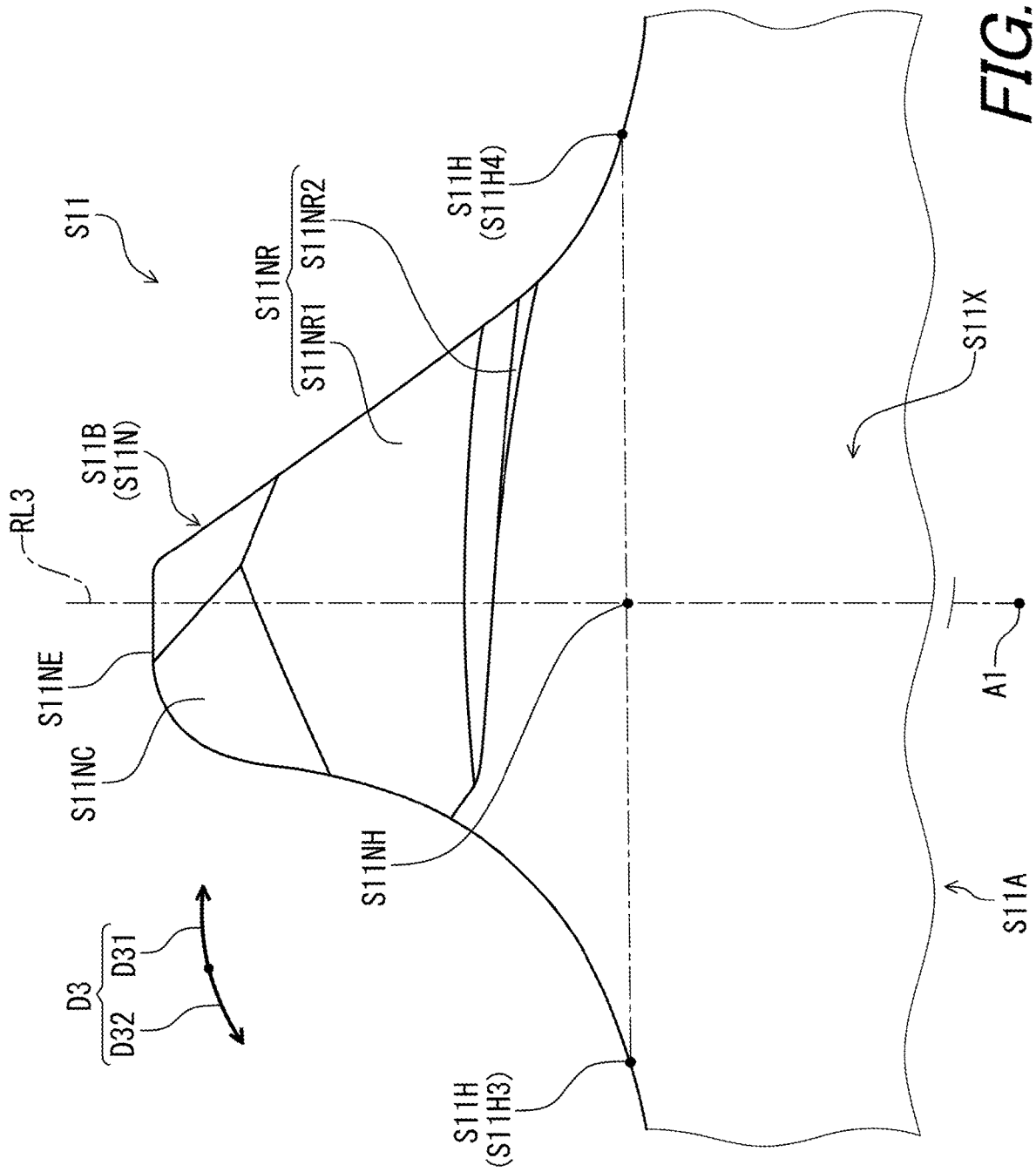
FIG. 18 is an enlarged partial side elevational view of a downstream tooth of the bicycle sprocket illustrated in FIG. 3.

As seen in FIG. 18, the downstream tooth S11N has a third tooth-bottom center point S11NH. The third tooth-bottom center point S11NH is provided at a middle point between the adjacent two tooth bottoms S1H3 and S11H4 of the downstream tooth S11N when viewed along the rotational center axis A1. In this embodiment, the downstream tooth S11N is asymmetric with respect to a third reference line RL3 passing through the rotational center axis A1 and the third tooth-bottom center point S11NH. However, the downstream tooth S11N can be symmetric with respect to the third reference line RL3.

Figure 19:
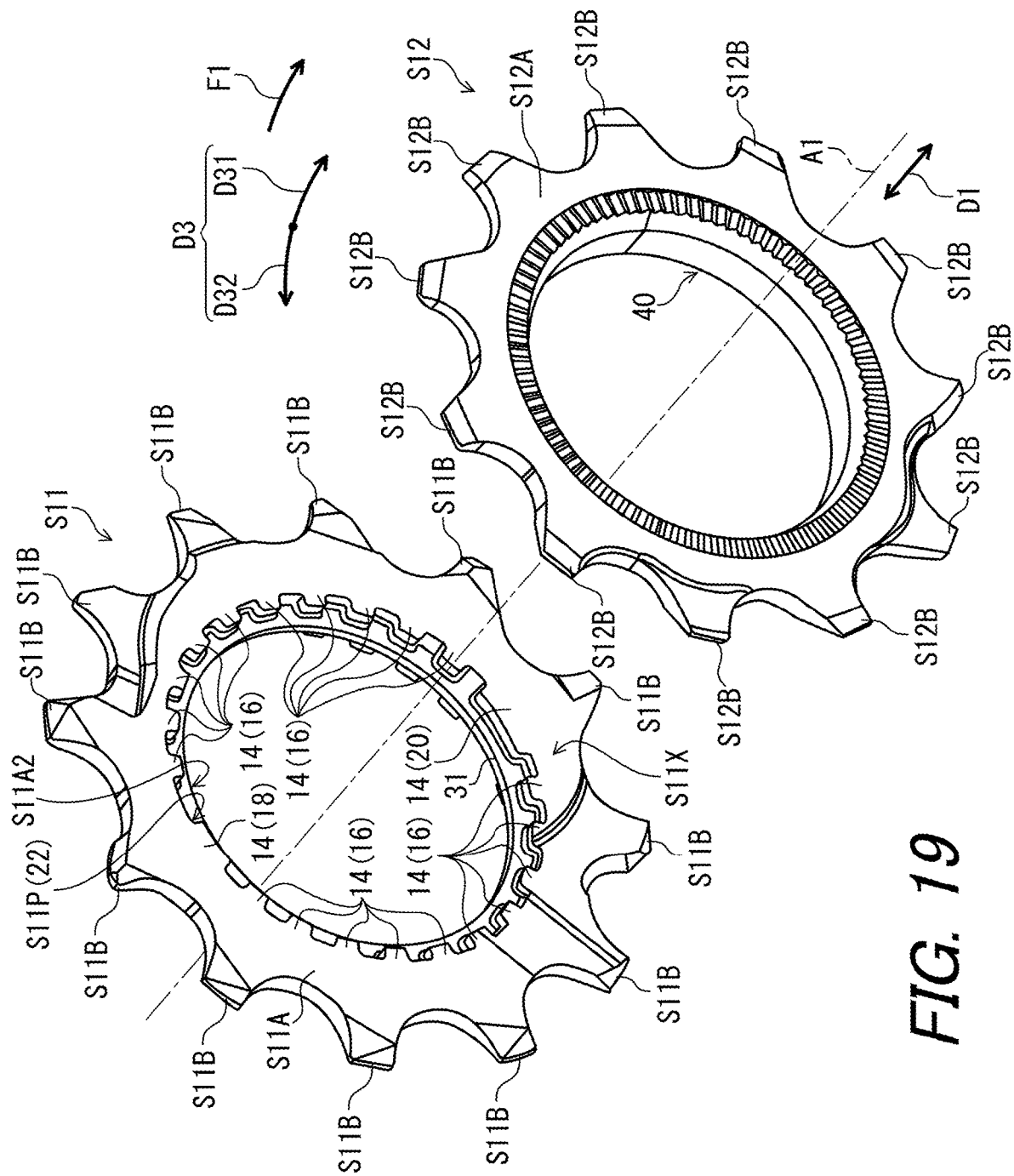
FIG. 19 is an exploded perspective view of the bicycle sprockets illustrated in FIGS. 3 and 4.
Figure 20:
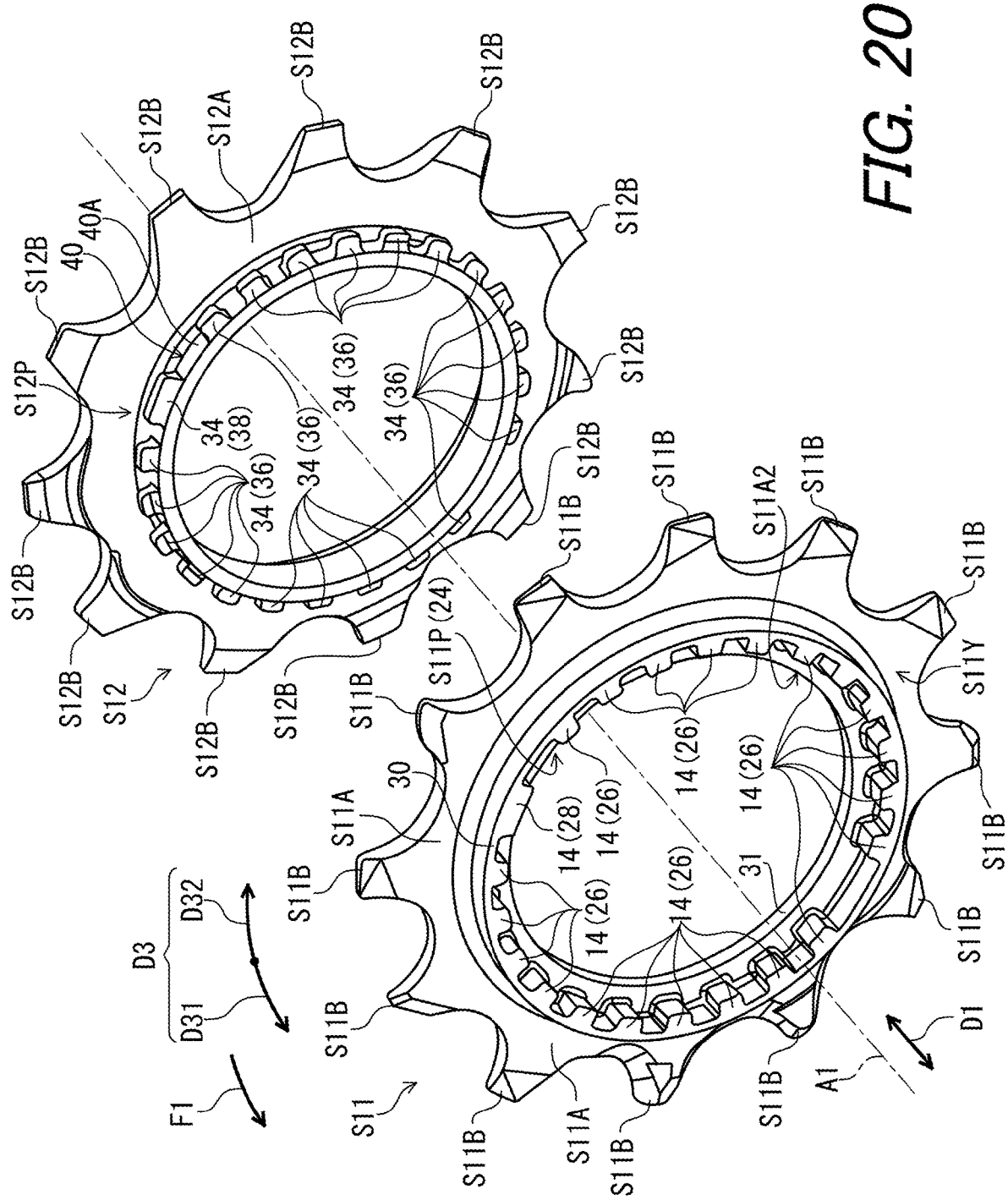
FIG. 20 is another exploded perspective view of the bicycle sprockets illustrated in FIGS. 3 and 4.

As seen in FIGS. 19 and 20, the bicycle sprocket S11 comprises a torque transmitting profile S11P positioned radially inwardly of the plurality of sprocket teeth S11B. The torque transmitting profile S11P is positioned around the inner periphery S11A2 of the sprocket body S11A. The torque transmitting profile S11P includes at least ten internal spline teeth 14. The at least ten internal spline teeth 14 include at least one first internal spline tooth 16, at least one second internal spline tooth 18 and at least one third internal spline tooth 20. The first internal spline tooth 16 can also be referred to as the first spline tooth 16. The second internal spline tooth 18 can also be referred to as the first spline tooth 18. The third internal spline tooth 20 can also be referred to as the first spline tooth 20.

In this embodiment, the at least ten internal spline teeth 14 include a first spline-tooth set 22 and a second spline-tooth set 24. The first spline-tooth set 22 is disposed on the first axially-facing surface S11X of the bicycle sprocket S11. The second spline-tooth set 24 is disposed on the second-axially facing surface S11Y of the bicycle sprocket S11. The first spline-tooth set 22 includes the at least one first internal spline tooth 16, the at least one second internal spline tooth 18 and the at least one third internal spline tooth 20. In other words, the first spline-tooth set 22 includes a plurality of first spline teeth 16, 18 and 20. However, the second spline-tooth set 24 (see, e.g., FIG. 20) can include the at least one first internal spline tooth 16, the at least one second internal spline tooth 18 and the at least one third internal spline tooth 20.

The smaller sprocket S12 includes an additional torque transmitting profile S12P positioned radially inwardly of the plurality of sprocket teeth S12B. The additional torque transmitting profile S12P is configured to be engaged with the torque transmitting profile S11P of the bicycle sprocket S11. The additional torque transmitting profile S12P meshes with the torque transmitting profile S11P to transmit a driving rotational force F1 from the smaller sprocket S12 to the bicycle sprocket S11.

As seen in FIG. 19, the at least one first internal spline tooth 16 includes a plurality of first internal spline teeth 16. In this embodiment, the total number of the at least one first internal spline tooth 16 is 20. A total number of the at least one second internal spline tooth 18 is one. Namely, the at least one second internal spline-tooth 18 is a single spline tooth. A total number of the at least one third internal spline tooth 20 is one. Namely, the at least one second internal spline-tooth 20 is a single spline tooth. However, the total number of the at least one first internal spline tooth 16 is not limited to this embodiment. The total number of the at least one second internal spline tooth 18 is not limited to this embodiment. The total number of the at least one third internal spline tooth 20 is not limited to this embodiment.

As seen in FIG. 20, the at least ten internal spline teeth 14 includes at least one first additional internal spline tooth 26 and at least one second additional internal spline tooth 28. The second spline-tooth set 24 includes the at least one first additional internal spline tooth 26 and the at least one second additional internal spline tooth 28. The first additional internal spline tooth 26 can also be referred to as the second spline tooth 26. The second additional internal spline tooth 28 can also be referred to as the second spline tooth 28. In other words, the second spline-tooth set 24 includes a plurality of second spline teeth 26 and 28. However, the first spline-tooth set 22 can include the at least one first additional internal spline tooth 26 and the at least one second additional internal spline tooth 28.

The at least one first additional internal spline tooth 26 includes a plurality of first additional internal spline teeth 26. The total number of the at least one first additional internal spline tooth 26 is 21. A total number of the at least one second additional internal spline tooth 28 is one. However, the total number of the at least one first additional internal spline tooth 26 is not limited to this embodiment. The total number of the at least one second additional internal spline tooth 28 is not limited to this embodiment.

Figure 21:
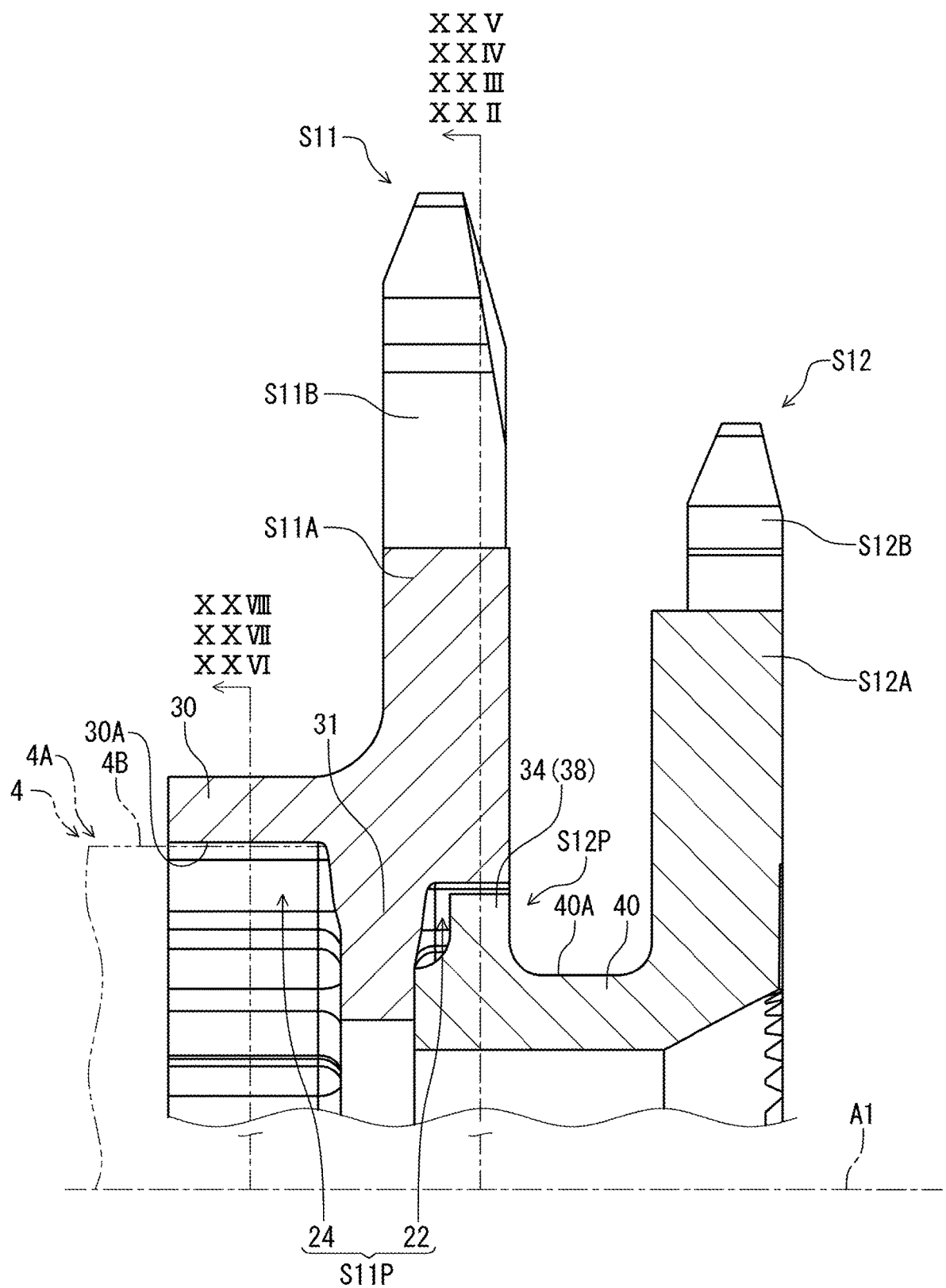
FIG. 21 is a partial cross-sectional view of the bicycle sprocket arrangement illustrated in FIG. 1.

As seen in FIGS. 20 and 21, the bicycle sprocket S11 comprises an annular protrusion 30 and a flange 31. The annular protrusion 30 extends from the sprocket body S11A in the axial direction D1. The flange 31 extends radially inwardly from the sprocket body S11A. The annular protrusion 30 extends from the second-axially facing surface S11Y in the axial direction D1. As seen in FIG. 20, the at least one first additional internal spline tooth 26 and the at least one second additional internal spline tooth 28 extend radially inwardly from an inner peripheral surface 30A of the annular protrusion 30.

As seen in FIG. 20, the additional torque transmitting profile S12P includes at least ten external spline teeth 34. The at least ten external spline teeth 34 include at least one first external spline tooth 36 and at least one second external spline tooth 38. In this embodiment, the at least one first external spline tooth 36 includes a plurality of first external spline teeth 36. A total number of the plurality of first external spline teeth 36 is 21. A total number of the at least one second external spline tooth 38 is one. However, the total number of the plurality of first external spline teeth 36 is not limited to this embodiment. The total number of the at least one second external spline tooth 38 is not limited to this embodiment.

As seen in FIGS. 20 and 21, the smaller sprocket S12 includes an additional annular protrusion 40 extending from the sprocket body S12A toward the bicycle sprocket SP11 in the axial direction D1. The second spline-tooth set 24 of the torque transmitting profile S11P is engaged with a plurality of external spline teeth 4B of a sprocket support body 4A of the bicycle hub assembly 4. As seen in FIG. 20, the at least one first external spline tooth 36 and the at least one second external spline tooth 38 extend radially outwardly from an outer peripheral surface 40A of the additional annular protrusion 40. The additional annular protrusion 40 is in contact with the flange 31 of the bicycle sprocket S11 in a state where the first spline-tooth set 22 of the torque transmitting profile S11P is engaged with the additional torque transmitting profile S12P.

Figure 22:
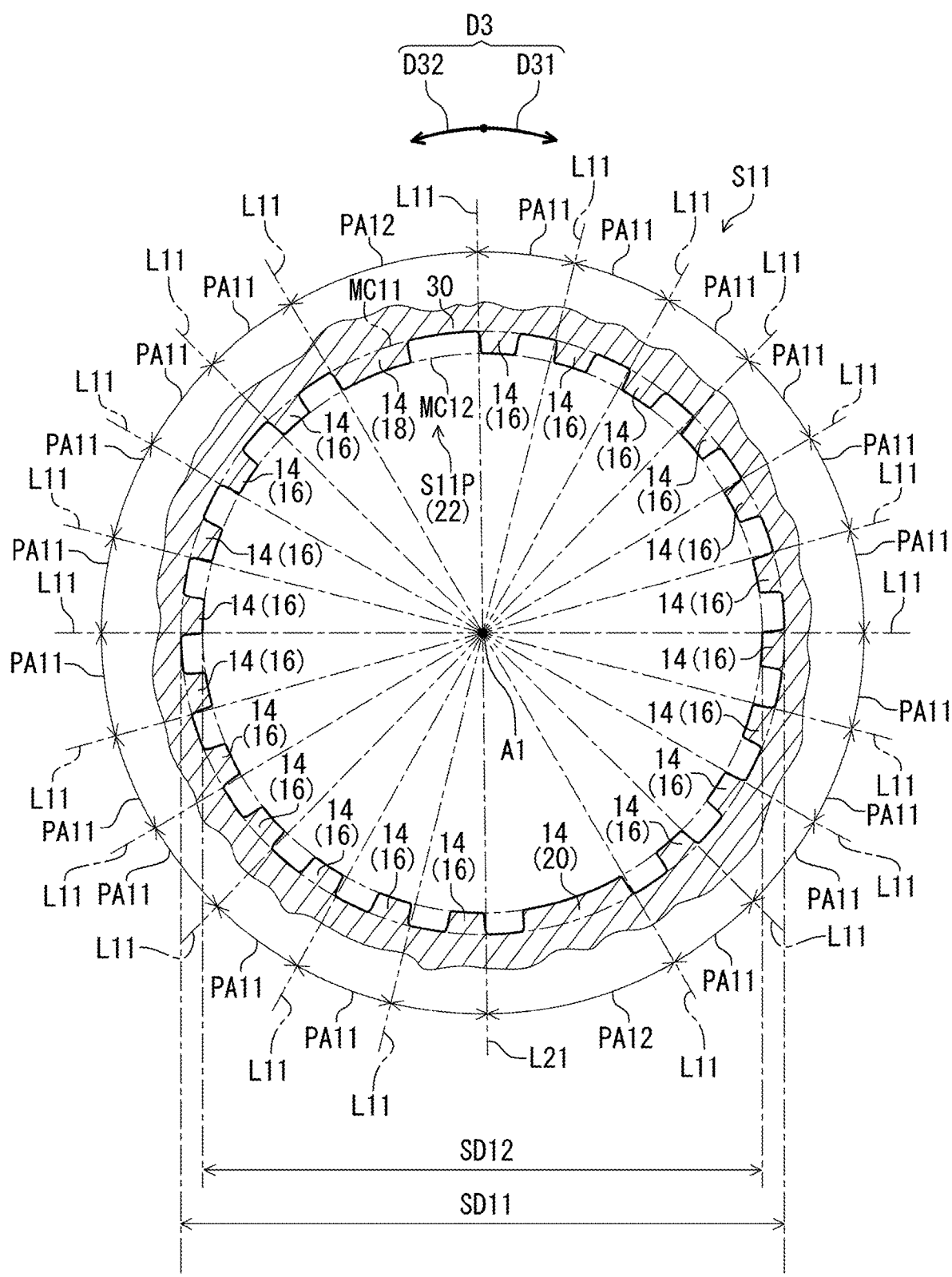
FIG. 22 is a cross-sectional view of the bicycle sprocket taken along line XXII-XXII of FIG. 21.

As seen in FIG. 22, the at least one first internal spline tooth 16, the at least one second internal spline tooth 18 and the at least one third internal spline tooth 20 are different in shape from each other. A cross-section of the first internal spline tooth 16, a cross-section of the second internal spline tooth 18, and a cross-section of the third internal spline tooth 20 are different from each other in a cross-sectional view taken along a plane perpendicular to the rotational center axis A1.

The at least ten internal spline teeth 14 have an internal-spline major diameter SD11. The at least one first internal spline tooth 16, the at least one second internal spline tooth 18 and the at least one third internal spline tooth 20 have the internal-spline major diameter SD11. Tooth bottoms of the first, second and third internal spline teeth 16, 18 and 20 define an internal-spline major circle MCl 1. The internal-spline major diameter SD11 is defined as a diameter of the internal-spline major circle MC11. The internal-spline major diameter SD11 preferably ranges from 30 mm to 34 mm. The internal-spline major diameter SD11 is more preferably equal to or smaller than 33 mm. The internal-spline major diameter SDI 1 is more preferably equal to or larger than 32 mm. In this embodiment, the internal-spline major diameter SD11 is 32.6 mm. However, the internal-spline major diameter SD11 is not limited to this embodiment and the above ranges.

The at least ten internal spline teeth 14 have an internal-spline minor diameter SD12. The at least one first internal spline tooth 16, the at least one second internal spline tooth 18 and the at least one third internal spline tooth 20 have the internal-spline minor diameter SD12. Radially innermost ends of the first, second and third internal spline teeth 16, 18 and 20 define an internal-spline minor circle MC12. The internal-spline minor diameter SD12 is defined as a diameter of the internal-spline minor circle MC12. The internal-spline minor diameter SD12 preferably ranges from 29 mm to 32 mm. The internal-spline minor diameter SD12 is more preferably equal to or smaller than 31 mm. The internal-spline minor diameter SD12 is more preferably equal to or larger than 30 mm. In this embodiment, the internal-spline minor diameter SD12 is 30.2 mm. However, the internal-spline minor diameter SD12 is not limited to this embodiment and the above ranges.

At least two internal spline teeth of the at least ten internal spline teeth 14 are circumferentially arranged at a first internal pitch angle PA11 with respect to the rotational center axis A1. The first internal pitch angle PA11 preferably ranges from 10 degrees to 20 degrees. The first internal pitch angle PA11 more preferably ranges from 13 degrees to 16 degrees. In this embodiment, the first internal pitch angle PA11 is 15 degrees. However, the first internal pitch angle PA11 is not limited to this embodiment and the above ranges.

At least two other internal spline teeth of the at least ten internal spline teeth 14 are circumferentially arranged at a second internal pitch angle PA12 with respect to the rotational center axis A1. The second internal pitch angle PA12 is preferably equal to or larger than 20 degrees. The second internal pitch angle PA12 is preferably equal to or larger than 40 degrees. The second internal pitch angle PA12 more preferably ranges from 25 degrees to 35 degrees. In this embodiment, the second internal pitch angle PA12 is 30 degrees. However, the second internal pitch angle PA12 is not limited to this embodiment and the above ranges.

Figure 23:
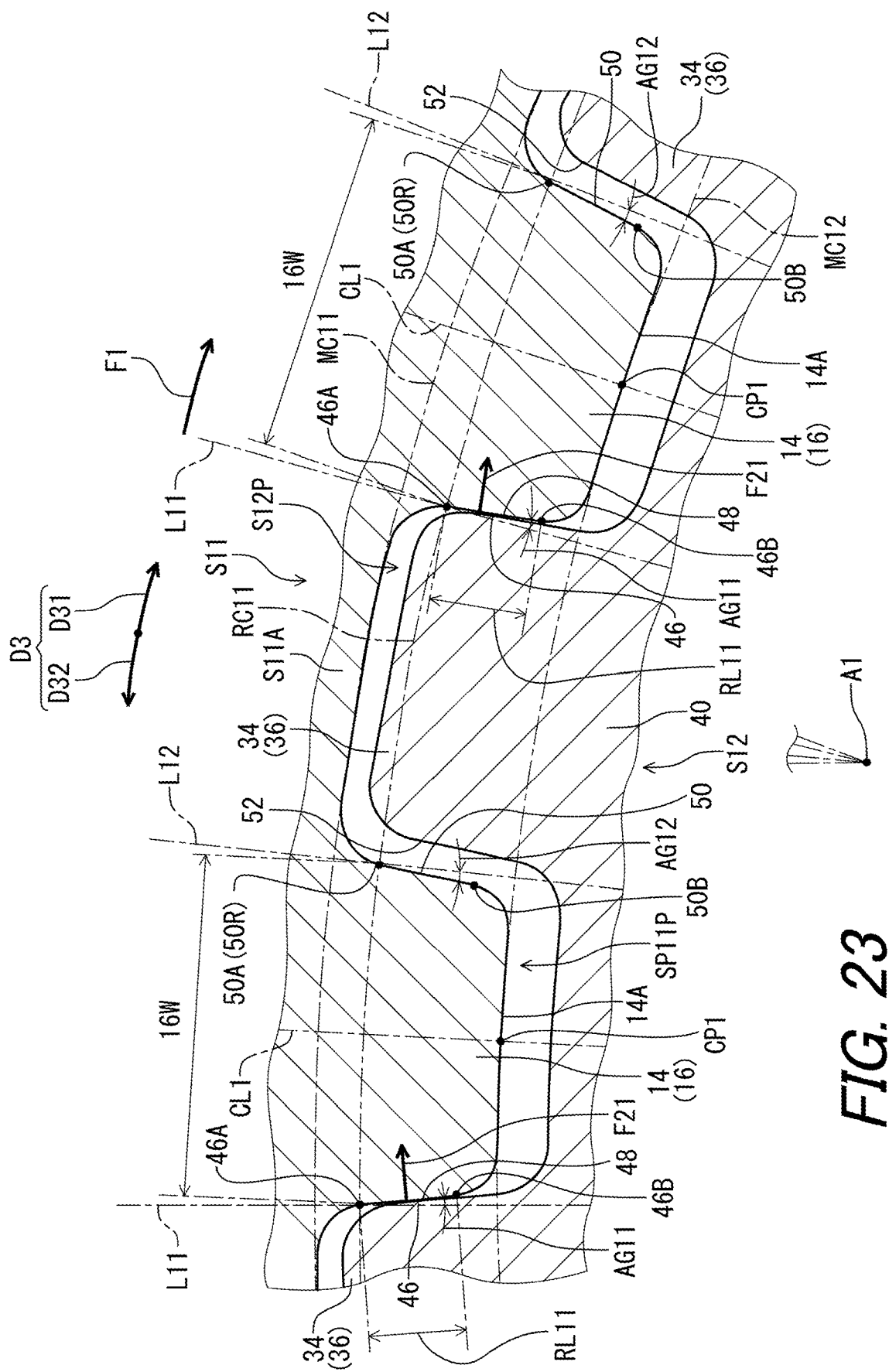
FIG. 23 is a partial cross-sectional view of the bicycle sprocket arrangement taken along line XXIII-XXIII of FIG. 21.
Figure 24:
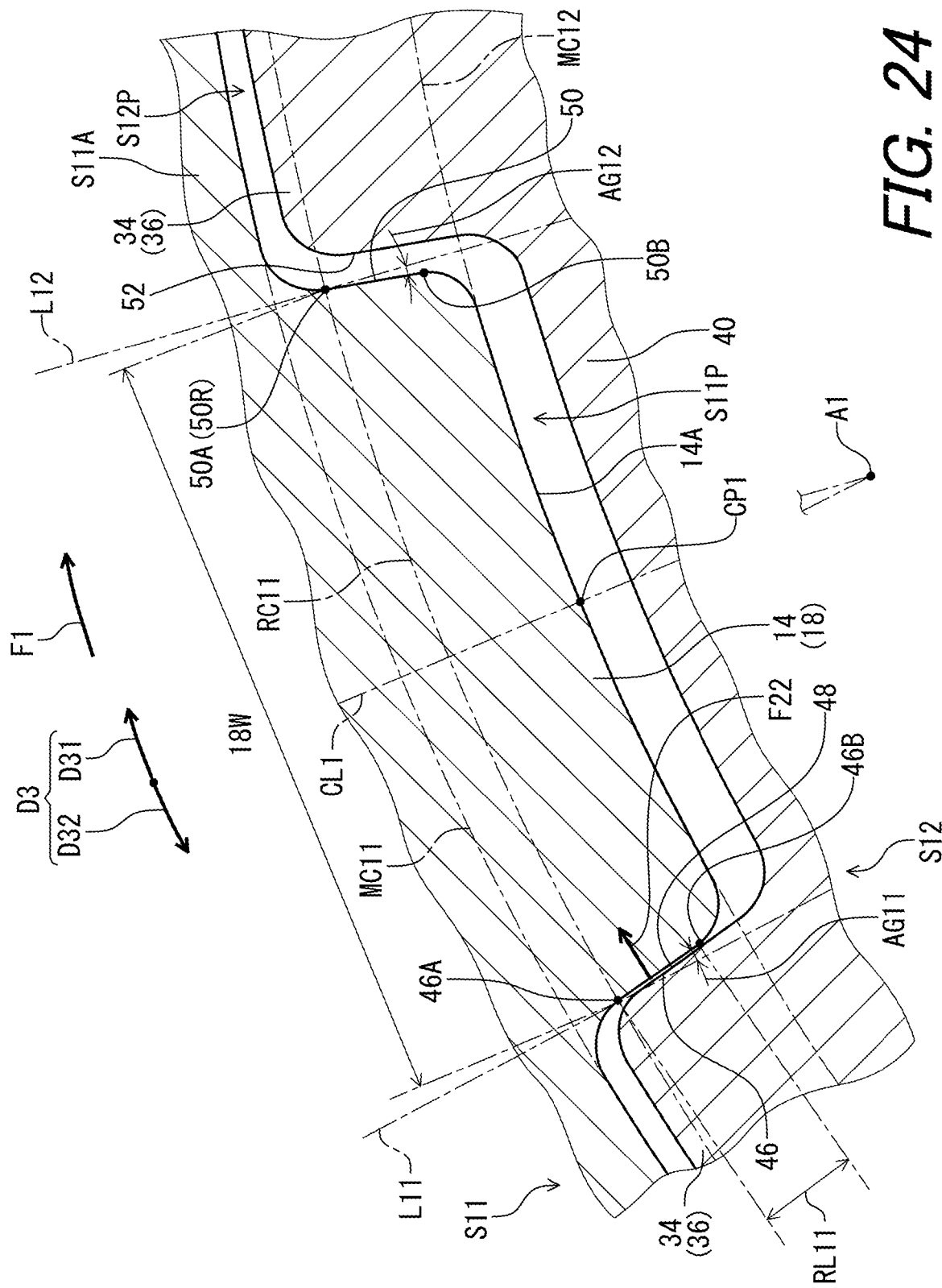
FIG. 24 is a partial cross-sectional view of the bicycle sprocket arrangement taken along line XXIV-XXIV of FIG. 21.
Figure 25:
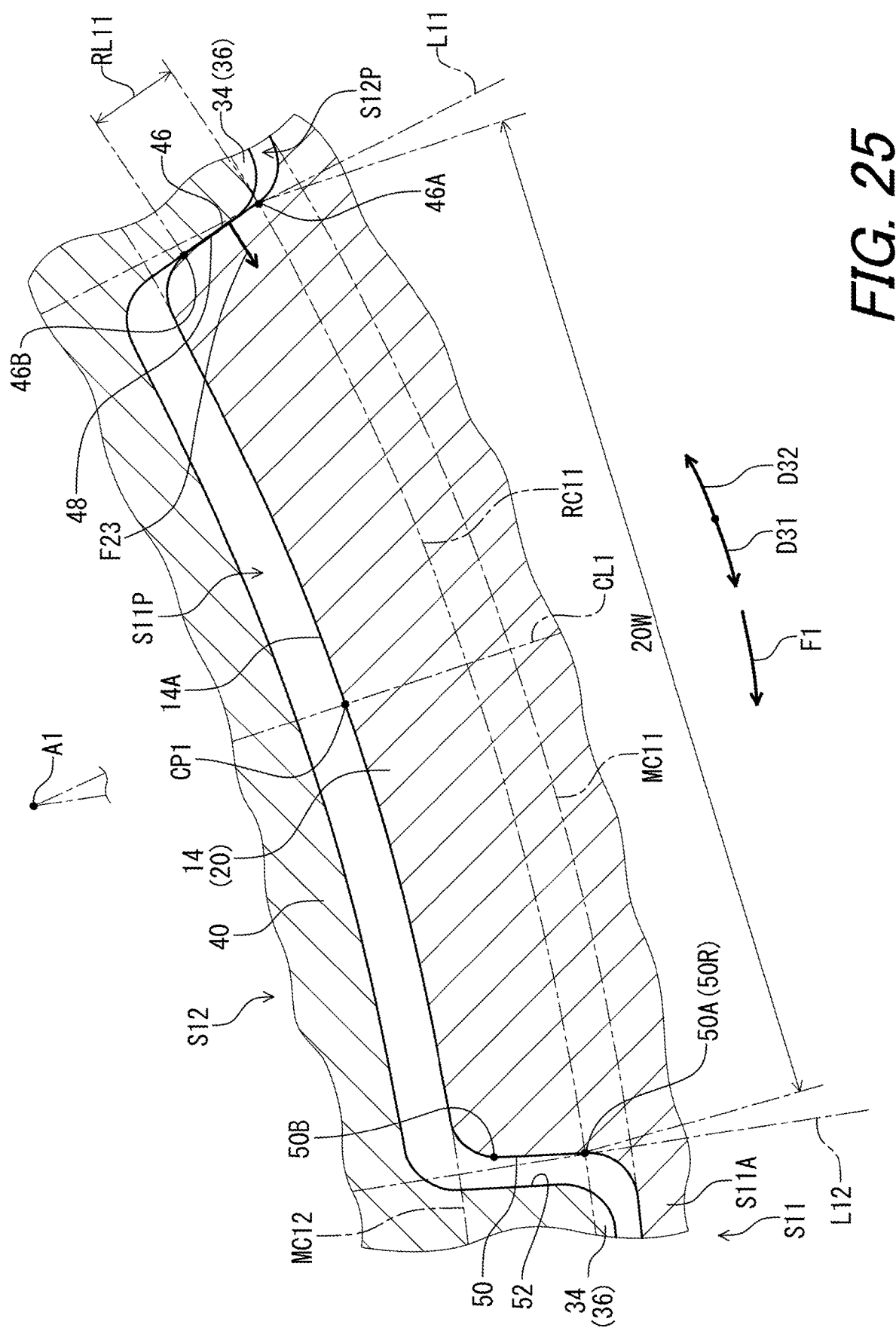
FIG. 25 is a partial cross-sectional view of the bicycle sprocket arrangement taken along line XXV-XXV of FIG. 21.

As seen in FIGS. 23 to 25, at least one internal spline tooth of the at least ten internal spline teeth 14 includes an internal-spline driving surface 46. The at least ten internal spline teeth 14 includes a plurality of internal-spline driving surfaces 46 to receive the driving rotational force F1 during pedaling. Each of the plurality of first internal spline teeth 16, the second internal spline tooth 18, and the third internal spline tooth 20 includes the internal-spline driving surface 46. The internal-spline driving surface 46 faces in the reverse rotational direction D32. The internal-spline driving surface 46 is contactable with the external spline tooth 34 to transmit the driving rotational force F1 from the smaller sprocket S12 to the bicycle sprocket S11 during pedaling in the state where the bicycle chain C is engaged with the smaller sprocket S12. The internal-spline driving surface 46 faces an external-spline driving surface 48 of the external spline tooth 34 in the state where the torque transmitting profile S11P is engaged with the additional torque transmitting profile S12P.

The at least one internal spline tooth of the at least ten internal spline teeth 14 includes an internal-spline non-driving surface 50. The at least ten internal spline teeth 14 includes a plurality of internal-spline non-driving surfaces 50. Each of the plurality of first internal spline teeth 16, the second internal spline tooth 18, and the third internal spline tooth 20 includes the internal-spline non-driving surface 50. The internal-spline non-driving surface 50 is provided on a reverse side of the internal-spline driving surface 46 in the circumferential direction D3. The internal-spline non-driving surface 50 faces in the driving rotational direction D31 not to transmit the driving rotational force F1 from the smaller sprocket S12 to the bicycle sprocket S11 during pedaling in the state where the bicycle chain C is engaged with the smaller sprocket S12. The internal-spline non-driving surface 50 faces an external-spline non-driving surface 52 of the external spline tooth 34 in a state where the torque transmitting profile S11P is engaged with the additional torque transmitting profile S12P.

The plurality of internal-spline driving surfaces 46 each includes a radially outermost edge 46A and a radially innermost edge 46B. The plurality of internal-spline driving surfaces 46 each includes a radial length RL11 defined from the radially outermost edge 46A to the radially innermost edge 46B. A total of the radial lengths RL11 of the plurality of internal-spline driving surfaces 46 is equal to or larger than 7 mm. The total of the radial lengths RL11 is equal to or larger than 10 mm. The total of the radial lengths RL11 is equal to or smaller than 30 mm. In this embodiment, the total of the radial lengths RL11 is 18.85 mm. However, the total of the radial lengths RL11 is not limited to this embodiment and the above ranges.

As seen in FIG. 23, the at least one first internal spline tooth 16 has a first circumferential width 16W with respect to the rotational center axis A1. Each of the first internal spline teeth 16 has the first circumferential width 16W defined in the circumferential direction D3. In this embodiment, the first circumferential width 16W is defined as a maximum width to receive a thrust force F21 applied to the first internal spline tooth 16.

As seen in FIG. 24, the at least one second internal spline tooth 18 has a second circumferential width 18W with respect to the rotational center axis A1. Each of the second internal spline tooth 18 has the second circumferential width 18W defined in the circumferential direction D3. In this embodiment, the second circumferential width 18W is defined as a maximum width to receive a thrust force F22 applied to the second internal spline tooth 18.

As seen in FIG. 25, the at least one third internal spline tooth 20 has a third circumferential width 20W with respect to the rotational center axis A1. Each of the third internal spline tooth 20 has the third circumferential width 20W defined in the circumferential direction D3. In this embodiment, the third circumferential width 20W is defined as a maximum width to receive a thrust force F23 applied to the third internal spline tooth 20.

As seen in FIGS. 23 to 25, the first circumferential width 16W, the second circumferential width 18W and the third circumferential width 20W are different from each other. The third circumferential width 20W is larger than the first circumferential width 16W and the second circumferential width 18W. The second circumferential width 18W is larger than the first circumferential width 16W. However, the dimensional relationship among the first, second and third circumferential widths 16W, 18W and 20W is not limited to this embodiment.

A first reference circle RC11 is defined on the radially outermost edge 46A and is centered at the rotational center axis A1. The first reference circle RC11 intersects with the internal-spline non-driving surface 50 at a reference point 50R. As seen in FIG. 23, the first circumferential width 16W extends straight from the radially outermost edge 46A of the first internal spline tooth 16 to the reference point 50R of the first internal spline tooth 16 in the circumferential direction D3. As seen in FIG. 24, the second circumferential width 18W extends straight from the radially outermost edge 46A of the second internal spline tooth 18 to the reference point 50R of the second internal spline tooth 18 in the circumferential direction D3. As seen in FIG. 25, the third circumferential width 20W extends straight from the radially outermost edge 46A of the third internal spline tooth 20 to the reference point 50R of the third internal spline tooth 20 in the circumferential direction D3.

As seen in FIGS. 23 to 25, the internal-spline non-driving surface 50 includes a radially outermost edge 50A and a radially innermost edge 50B. The internal-spline non-driving surface 50 extends from the radially outermost edge 50A to the radially innermost edge 50B. The reference point 50R is provided on the radially outermost edge 50A when viewed along the rotational center axis A1. However, the reference point 50R can be provided at a position which is different from a position of the radially outermost edge 50A.

At least one internal spline tooth of the at least ten internal spline teeth 14 is circumferentially symmetric with respect to a reference line CL1 extending from the rotational center axis A1 to a circumferential center point CP1 of a radially innermost end 14A of the at least one internal spline tooth of the at least ten internal spline teeth 14 in a radial direction with respect to the rotational center axis A1. In this embodiment, each of the internal spline teeth 14 is circumferentially symmetric with respect to the reference line CL1. However, at least one tooth of the internal spline teeth 14 can be circumferentially asymmetric with respect to the reference line CL1.

The internal-spline driving surface 46 has a first internal-spline-surface angle AG11 defined between the internal-spline driving surface 46 and a first radial line L11. The first radial line L11 extends from the rotational center axis A1 to the radially outermost edge 46A of the internal-spline driving surface 46. As seen in FIG. 22, the first internal pitch angle PA11 or the second internal pitch angle PA12 is defined between adjacent two lines of the first radial lines L11.

As seen in FIGS. 23 to 25, the internal-spline non-driving surface 50 has a second internal-spline-surface angle AG12 defined between the internal-spline non-driving surface 50 and a second radial line L12. The second radial line L12 extends from the rotational center axis A1 to the radially outermost edge 50A of the internal-spline non-driving surface 50.

In this embodiment, the second internal-spline-surface angle AG12 is equal to the first internal-spline-surface angle AG11. However, the first internal-spline-surface angle AG11 can be different from the second internal-spline-surface angle AG12.

The first internal-spline-surface angle AG11 ranges from 0 degree to 6 degrees. The second internal-spline-surface angle AG12 ranges from 0 degree to 6 degrees. In this embodiment, the first internal-spline-surface angle AG11 and the second internal-spline-surface angle AG12 are 5 degrees. However, the first internal-spline-surface angle AG11 and the second internal-spline-surface angle AG12 are not limited to this embodiment and the above ranges.

Figure 26:
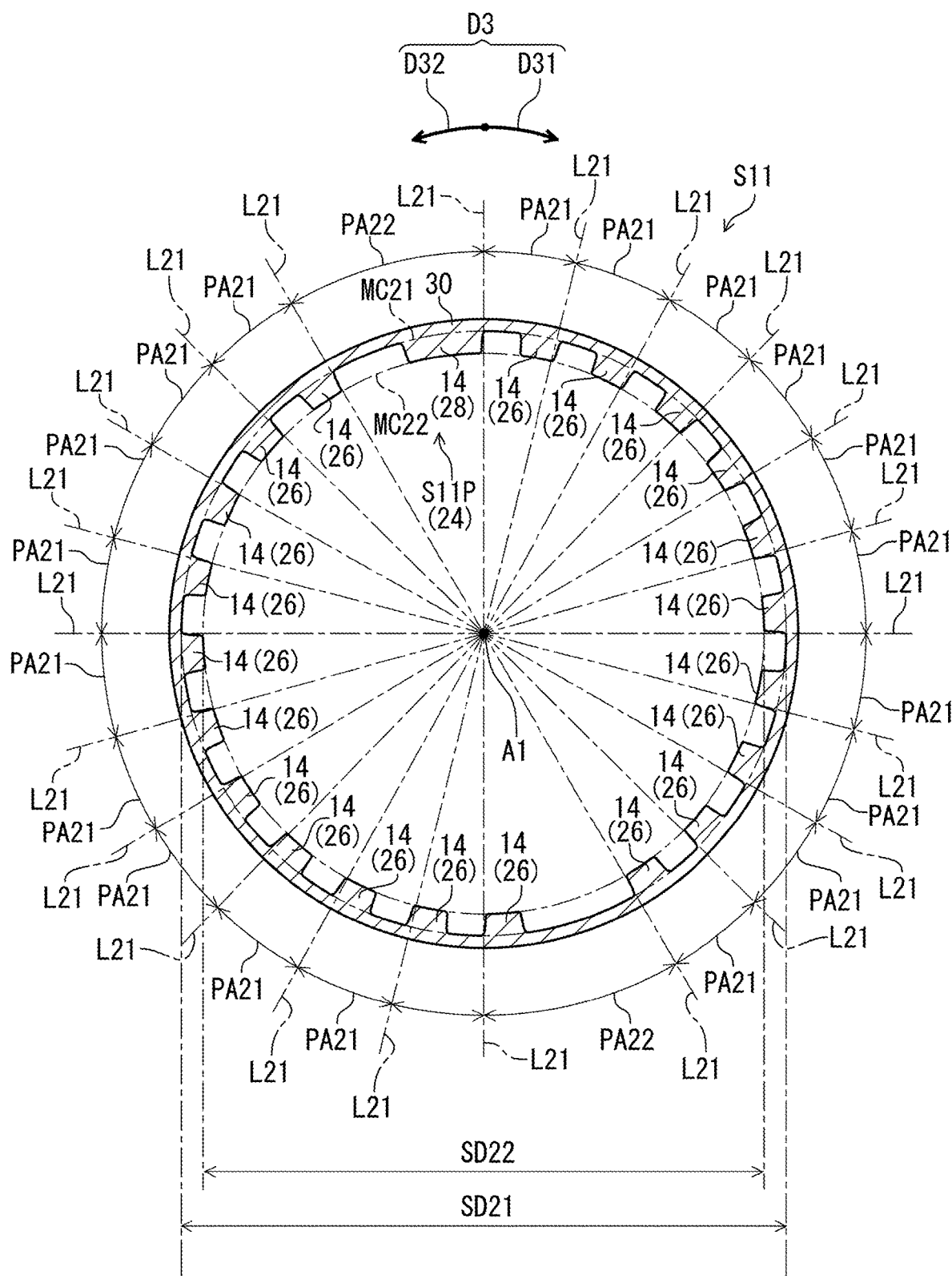
FIG. 26 is a cross-sectional view of the bicycle sprocket taken along line XXVI-XXVI of FIG. 21.

As seen in FIG. 26, the at least one first additional internal spline tooth 26 and the at least one second additional internal spline tooth 28 are different in shape from each other. A cross-section of the first additional internal spline tooth 26 and a cross-section of the second additional internal spline tooth 28 are different from each other in a cross-sectional view taken along a plane perpendicular to the rotational center axis A1.

The at least ten internal spline teeth 14 have an internal-spline major diameter SD21. The at least one first additional internal spline tooth 26 and the at least one second additional internal spline tooth 28 have the internal-spline major diameter SD21. Tooth bottoms of the first and second internal spline teeth 26 and 28 define an internal-spline major circle MC21. The internal-spline major diameter SD21 is defined as a diameter of the internal-spline major circle MC21. The internal-spline major diameter SD21 preferably ranges from 30 mm to 34 mm. The internal-spline major diameter SD21 is more preferably equal to or smaller than 33 mm. The internal-spline major diameter SD21 is more preferably equal to or larger than 32 mm. In this embodiment, the internal-spline major diameter SD21 is 32.6 mm. However, the internal-spline major diameter SD21 is not limited to this embodiment and the above ranges.

The at least ten internal spline teeth 14 have an internal-spline minor diameter SD22. The at least one first additional internal spline tooth 26 and the at least one second additional internal spline tooth 28 have the internal-spline minor diameter SD22. Radially innermost ends of the first and second internal spline teeth 26 and 28 define an internal-spline minor circle MC22. The internal-spline minor diameter SD22 is defined as a diameter of the internal-spline minor circle MC22. The internal-spline minor diameter SD22 preferably ranges from 29 mm to 32 mm. The internal-spline minor diameter SD22 is more preferably equal to or smaller than 31 mm. The internal-spline minor diameter SD22 is more preferably equal to or larger than 30 mm. In this embodiment, the internal-spline minor diameter SD22 is 30.2 mm. However, the internal-spline minor diameter SD22 is not limited to this embodiment and the above ranges.

At least two internal spline teeth of the at least ten internal spline teeth 14 are circumferentially arranged at a first internal pitch angle PA21 with respect to the rotational center axis A1. The first internal pitch angle PA21 preferably ranges from 10 degrees to 20 degrees. The first internal pitch angle PA21 more preferably ranges from 13 degrees to 16 degrees. In this embodiment, the first internal pitch angle PA21 is 15 degrees. However, the first internal pitch angle PA21 is not limited to this embodiment and the above ranges.

At least two other internal spline teeth of the at least ten internal spline teeth 14 are circumferentially arranged at a second internal pitch angle PA22 with respect to the rotational center axis A1. The second internal pitch angle PA22 is preferably equal to or larger than 20 degrees. The second internal pitch angle PA22 is preferably equal to or larger than 40 degrees. The second internal pitch angle PA22 more preferably ranges from 25 degrees to 35 degrees. In this embodiment, the second internal pitch angle PA22 is 30 degrees. However, the second internal pitch angle PA22 is not limited to this embodiment and the above ranges.

Figure 27:
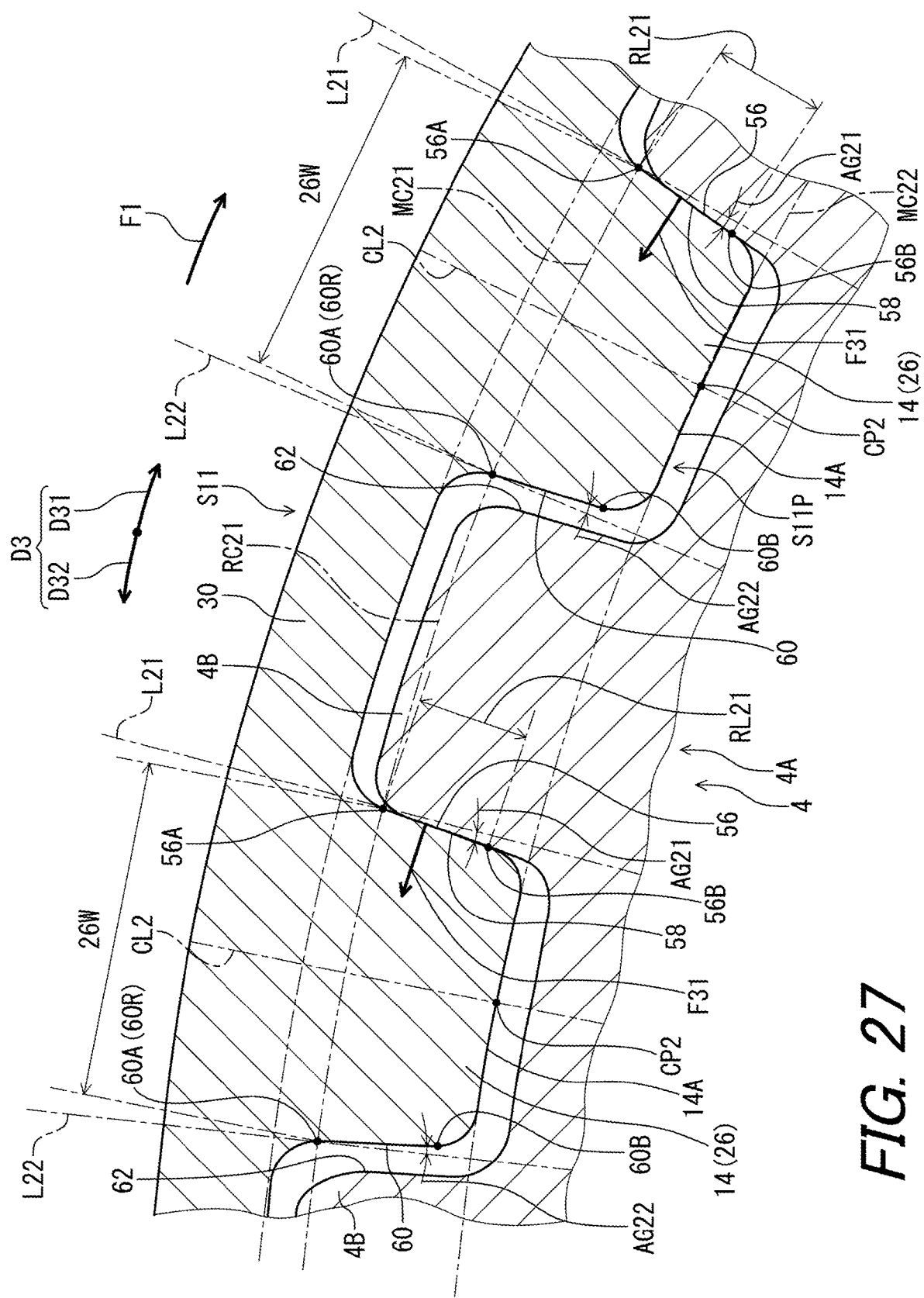
FIG. 27 is a cross-sectional view of the bicycle sprocket arrangement taken along line XXVII-XXVII of FIG. 21, with a sprocket support body of a hub assembly.
Figure 28:
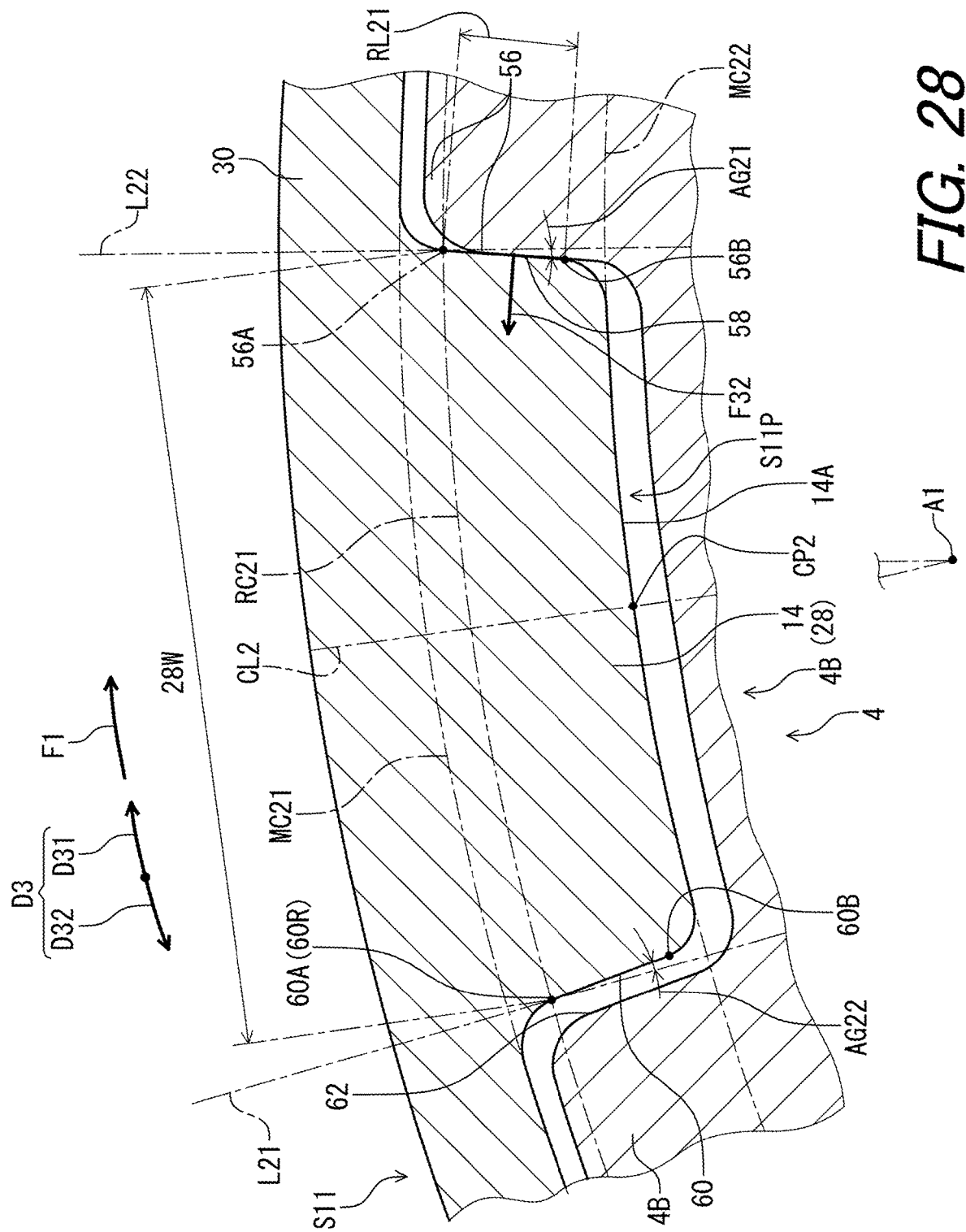
FIG. 28 is a cross-sectional view of the bicycle sprocket arrangement taken along line XXVIII-XXVIII of FIG. 21, with the sprocket support body of the hub assembly.

As seen in FIGS. 27 and 28, at least one internal spline tooth of the at least ten internal spline teeth 14 includes an internal-spline driving surface 56. The at least ten internal spline teeth 14 includes a plurality of internal-spline driving surfaces 56 to receive the driving rotational force F1 during pedaling. Each of the plurality of first additional internal spline teeth 26 and the second additional internal spline tooth 28 includes the internal-spline driving surface 56. The internal-spline driving surface 56 faces in the driving rotational direction D31. The internal-spline driving surface 56 is contactable with the external spline tooth 34 to transmit the driving rotational force F1 from the bicycle sprocket S11 to the sprocket support body 4A of the bicycle hub assembly 4 (see, e.g., FIG. 21) during pedaling in the state where the bicycle chain C is engaged with the bicycle sprocket S11. The internal-spline driving surface 56 faces an external-spline driving surface 58 of the external spline tooth 4B of the sprocket support body 4A in the state where the torque transmitting profile S11P is engaged with the sprocket support body 4A.

The at least one internal spline tooth of the at least ten internal spline teeth 14 includes an internal-spline non-driving surface 60. The at least ten internal spline teeth 14 includes a plurality of internal-spline non-driving surfaces 60. Each of the plurality of first additional internal spline teeth 26 and the second additional internal spline tooth 28 includes the internal-spline non-driving surface 60. The internal-spline non-driving surface 60 is provided on a reverse side of the internal-spline driving surface 56 in the circumferential direction D3. The internal-spline non-driving surface 60 faces in the reverse rotational direction D32 not to transmit the driving rotational force F1 from the bicycle sprocket S1i to the sprocket support body 4A of the bicycle hub assembly 4 during pedaling in the state where the bicycle chain C is engaged with the bicycle sprocket S11. The internal-spline non-driving surface 60 faces an external-spline non-driving surface 62 of the external spline tooth 4B in a state where the torque transmitting profile S11P is engaged with the sprocket support body 4A.

The plurality of internal-spline driving surfaces 56 each includes a radially outermost edge 56A and a radially innermost edge 56B. The plurality of internal-spline driving surfaces 56 each includes a radial length RL21 defined from the radially outermost edge 56A to the radially innermost edge 56B. A total of the radial lengths RL21 of the plurality of internal-spline driving surfaces 56 is equal to or larger than 7 mm. The total of the radial lengths RL21 is equal to or larger than 10 mm. The total of the radial lengths RL21 is equal to or smaller than 30 mm. In this embodiment, the total of the radial lengths RL21 is 18.85 mm. However, the total of the radial lengths RL21 is not limited to this embodiment and the above ranges.

As seen in FIG. 27, the at least one first additional internal spline tooth 26 has a first circumferential width 26W with respect to the rotational center axis A1. Each of the first additional internal spline teeth 26 has the first circumferential width 26W defined in the circumferential direction D3. In this embodiment, the first circumferential width 26W is defined as a maximum width to receive a thrust force F31 applied to the first additional internal spline tooth 26.

As seen in FIG. 28, the at least one second additional internal spline tooth 28 has a second circumferential width 28W with respect to the rotational center axis A1. Each of the second internal spline teeth 28 has the second circumferential width 28W defined in the circumferential direction D3. In this embodiment, the second circumferential width 28W is defined as a maximum width to receive a thrust force F32 applied to the second additional internal spline tooth 28.

As seen in FIGS. 27 and 28, the first circumferential width 26W and the second circumferential width 28W are different from each other. The second circumferential width 28W is larger than the first circumferential width 26W. However, the dimensional relationship among the first and second circumferential widths 26W and 28W is not limited to this embodiment.

A first reference circle RC21 is defined on the radially outermost edge 56A and is centered at the rotational center axis A1. The first reference circle RC21 intersects with the internal-spline non-driving surface 60 at a reference point 60R. As seen in FIG. 27, the first circumferential width 26W extends straight from the radially outermost edge 56A of the first additional internal spline tooth 26 to the reference point 60R of the first additional internal spline tooth 26 in the circumferential direction D3. As seen in FIG. 28, the second circumferential width 28W extends straight from the radially outermost edge 56A of the second additional internal spline tooth 28 to the reference point 60R of the second additional internal spline tooth 28 in the circumferential direction D3.

As seen in FIGS. 27 and 28, the internal-spline non-driving surface 60 includes a radially outermost edge 60A and a radially innermost edge 60B. The internal-spline non-driving surface 60 extends from the radially outermost edge 60A to the radially innermost edge 60B. The reference point 60R is provided on the radially outermost edge 60A when viewed along the rotational center axis A1. However, the reference point 60R can be provided at a position which is different from a position of the radially outermost edge 60A.

At least one internal spline tooth of the at least ten internal spline teeth 14 is circumferentially symmetric with respect to a reference line CL2 extending from the rotational center axis A1 to a circumferential center point CP2 of a radially innermost end 14A of the at least one internal spline tooth of the at least ten internal spline teeth 14 in a radial direction with respect to the rotational center axis A1. In this embodiment, each of the internal spline teeth 14 is circumferentially symmetric with respect to the reference line CL2. However, at least one tooth of the internal spline teeth 14 can be circumferentially asymmetric with respect to the reference line CL2.

The internal-spline driving surface 56 has a first internal-spline-surface angle AG21 defined between the internal-spline driving surface 56 and a first radial line L21. The first radial line L21 extends from the rotational center axis A1 to the radially outermost edge 56A of the internal-spline driving surface 56. As seen in FIG. 26, the first internal pitch angle PA21 or the second internal pitch angle PA22 is defined between adjacent two lines of the first radial lines L21.

As seen in FIGS. 27 and 28, the internal-spline non-driving surface 60 has a second internal-spline-surface angle AG22 defined between the internal-spline non-driving surface 60 and a second radial line L22. The second radial line L22 extends from the rotational center axis A1 to the radially outermost edge 60A of the internal-spline non-driving surface 60.

In this embodiment, the second internal-spline-surface angle AG22 is equal to the first internal-spline-surface angle AG21. However, the first internal-spline-surface angle AG21 can be different from the second internal-spline-surface angle AG22.

The first internal-spline-surface angle AG21 ranges from 0 degree to 6 degrees. The second internal-spline-surface angle AG22 ranges from 0 degree to 6 degrees. In this embodiment, the first internal-spline-surface angle AG21 and the second internal-spline-surface angle AG22 are 5 degrees. However, the first internal-spline-surface angle AG21 and the second internal-spline-surface angle AG22 are not limited to this embodiment and the above ranges.

Figure 29:
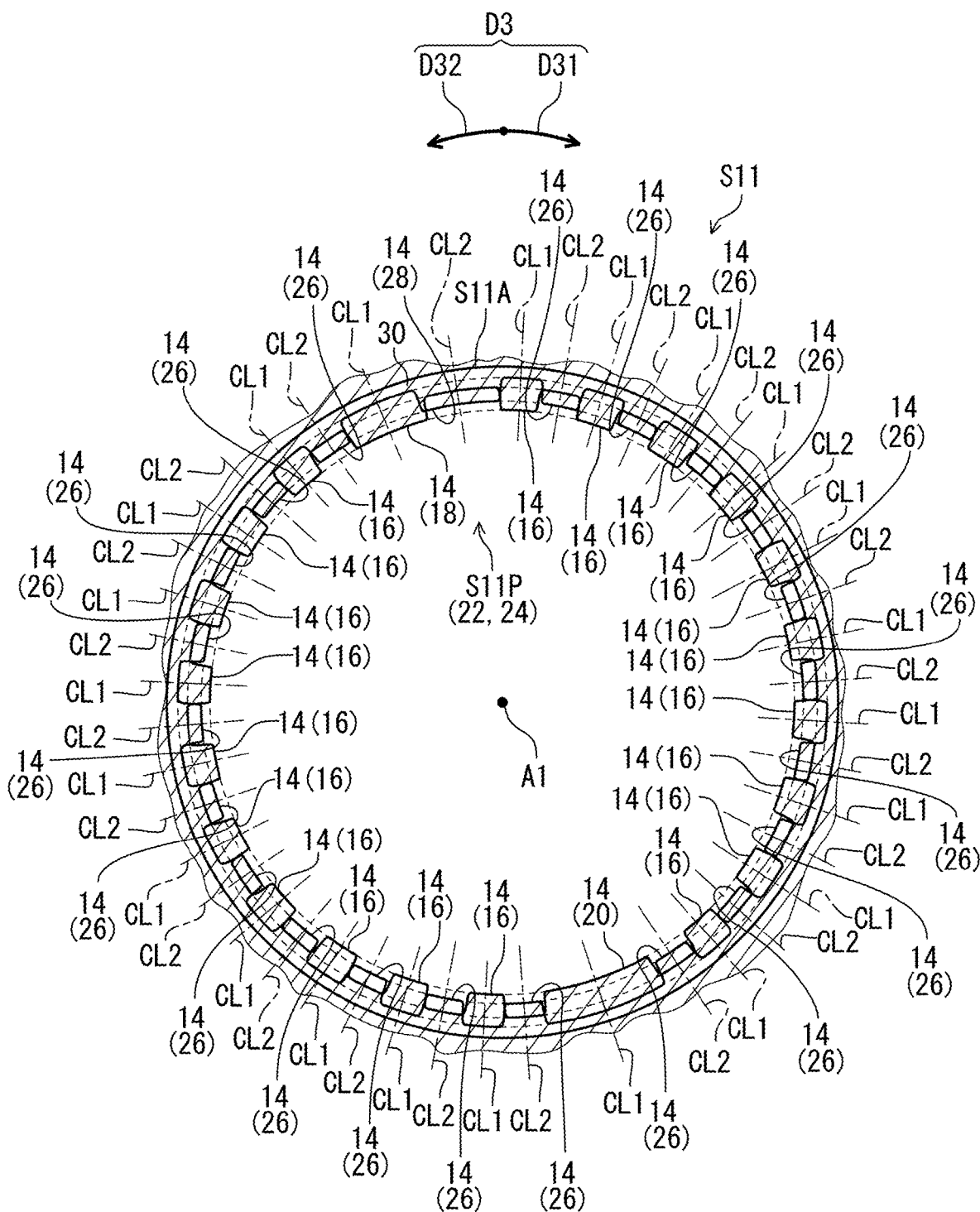
FIG. 29 depicts overlapped cross-sections which are respectively illustrated in FIGS. 22 and 26.

As seen in FIG. 29, the plurality of first spline teeth 16, 18 and 20 of the first spline-tooth set 22 is at least partly offset from the plurality of second spline teeth 26 and 28 of the second spline-tooth set 24 in the circumferential direction D3 with respect to the rotational center axis A1. In this embodiment, each of the reference lines CL1 of the plurality of first spline teeth 16, 18 and 20 are offset from each of the reference lines CL2 of the plurality of second spline teeth 26 and 28 in the circumferential direction D3 when viewed along the rotational center axis A1. However, the positional relationship between the plurality of first spline teeth 16, 18 and 20 and the plurality of second spline teeth 26 and 28 is not limited to this embodiment.

In accordance with a twenty-first aspect of the present invention, a bicycle sprocket comprises a sprocket body, a plurality of sprocket teeth, and a torque transmitting profile. The plurality of sprocket teeth extends radially outwardly from the sprocket body with respect to a rotational center axis of the bicycle sprocket. The torque transmitting profile is positioned radially inwardly of the plurality of sprocket teeth. The torque transmitting profile includes at least ten internal spline teeth. The at least ten internal spline teeth include at least one first internal spline tooth, at least one second internal spline tooth and at least one third internal spline tooth. The at least one first internal spline tooth, the at least one second internal spline tooth and the at least one third internal spline tooth are different in shape from each other.

With the bicycle sprocket according to the twenty-first aspect, it is possible to improve strength of at least one of the first to third internal spline teeth with suppressing a wrong assembly of the bicycle sprocket.

In accordance with a twenty-second aspect of the present invention, the bicycle sprocket according to the twenty-first aspect is configured so that the at least one first internal spline tooth has a first circumferential width with respect to the rotational center axis. The at least one second internal spline tooth has a second circumferential width with respect to the rotational center axis. The at least one third internal spline tooth has a third circumferential width with respect to the rotational center axis. The first circumferential width, the second circumferential width and the third circumferential width are different from each other.

With the bicycle sprocket according to the twenty-second aspect, it is possible to reliably suppress the wrong assembly of the bicycle sprocket.

In accordance with a twenty-third aspect of the present invention, the bicycle sprocket according to the twenty-first or twenty-second aspect further comprises a first axially-facing surface and a second-axially facing surface. The second-axially facing surface is provided on a reverse side of the first axially-facing surface in an axial direction with respect to the rotational center axis. The at least ten internal spline teeth include a first spline-tooth set and a second spline-tooth set. The first spline-tooth set is disposed on the first axially-facing surface of the bicycle sprocket. The second spline-tooth set is disposed on the second-axially facing surface of the bicycle sprocket.

With the bicycle sprocket according to the twenty-third aspect, it is possible to more reliably suppress the wrong assembly of the bicycle sprocket.

In accordance with a twenty-fourth aspect of the present invention, the bicycle sprocket according to the twenty-third aspect is configured so that the first spline-tooth set includes the at least one first internal spline tooth, the at least one second internal spline tooth and the at least one third internal spline tooth.

With the bicycle sprocket according to the twenty-fourth aspect, it is possible to more reliably suppress the wrong assembly of the bicycle sprocket.

In accordance with a twenty-fifth aspect of the present invention, the bicycle sprocket according to the twenty-third or twenty-fourth aspect is configured so that the first axially-facing surface faces axially outwardly in the axial direction with respect to a center plane of a bicycle frame in a mounting state where the bicycle sprocket is mounted to the bicycle frame.

With the bicycle sprocket according to the twenty-fifth aspect, it is possible to more reliably suppress the wrong assembly of the bicycle sprocket with respect to a smaller sprocket adjacent to the bicycle sprocket.

In accordance with a twenty-sixth aspect of the present invention, the bicycle sprocket according to the twenty-third aspect is configured so that the first spline-tooth set includes a plurality of first spline teeth. The second spline-tooth set includes a plurality of second spline teeth. The plurality of first spline teeth of the first spline-tooth set is at least partly offset from the plurality of second spline teeth of the second spline-tooth set in a circumferential direction with respect to the rotational center axis.

With the bicycle sprocket according to the twenty-sixth aspect, it is possible to ensure strength of the bicycle sprocket.

In accordance with a twenty-seventh aspect of the present invention, the bicycle sprocket according to any one of the twenty-first to twenty-sixth aspects is configured so that the at least one first internal spline tooth includes a plurality of first internal spline teeth. A total number of the at least one second internal spline tooth is one. A total number of the at least one third internal spline tooth is one.

With the bicycle sprocket according to the twenty-seventh aspect, it is possible to reliably suppress the wrong assembly of the bicycle sprocket.

In accordance with a twenty-eighth aspect of the present invention, the bicycle sprocket according to any one of the twenty-first to twenty-seventh aspects is configured so that the at least ten internal spline teeth have an internal-spline major diameter equal to or smaller than 33 mm.

With the bicycle sprocket according to the twenty-eighth aspect, it is possible to ensure strength of the bicycle sprocket having a smaller internal-spline major diameter.

In accordance with a twenty-ninth aspect of the present invention, the bicycle sprocket according to the twenty-eighth aspect is configured so that the internal-spline major diameter is equal to or larger than 32 mm.

With the bicycle sprocket according to the twenty-ninth aspect, it is possible to save a weight of the bicycle sprocket.

In accordance with a thirtieth aspect of the present invention, the bicycle sprocket according to any one of the twenty-first to twenty-ninth aspects is configured so that the at least ten internal spline teeth have an internal-spline minor diameter equal to or smaller than 31 mm.

With the bicycle sprocket according to the thirtieth aspect, it is possible to ensure strength of the at least ten internal spline teeth.

In accordance with an thirty-first aspect of the present invention, the bicycle sprocket according to the thirtieth aspect is configured so that the internal-spline minor diameter is equal to or larger than 30 mm.

With the bicycle sprocket according to the thirty-first aspect, it is possible to save a weight of the bicycle sprocket.

In accordance with a thirty-second aspect of the present invention, the bicycle sprocket according to any one of the twenty-first to thirty-first aspects is configured so that at least two internal spline teeth of the at least ten internal spline teeth are circumferentially arranged at a first internal pitch angle with respect to the rotational center axis. The first internal pitch angle ranges from 10 degrees to 20 degrees.

With the bicycle sprocket according to the thirty-second aspect, it is possible to ensure strength of the at least ten internal spline teeth.

In accordance with a thirty-third aspect of the present invention, the bicycle sprocket according to the thirty-second aspect is configured so that the first internal pitch angle ranges from 13 degrees to 16 degrees.

With the bicycle sprocket according to the thirty-third aspect, it is possible to reliably ensure strength of the at least ten internal spline teeth.

In accordance with a thirty-fourth aspect of the present invention, the bicycle sprocket according to the thirty-second or thirty-third aspect is configured so that at least two other internal spline teeth of the at least ten internal spline teeth are circumferentially arranged at a second internal pitch angle with respect to the rotational center axis. The second internal pitch angle is equal to or larger than 20 degrees.

With the bicycle sprocket according to the thirty-fourth aspect, it is possible to suppress the wrong assembly of the bicycle sprocket.

In accordance with a thirty-fifth aspect of the present invention, the bicycle sprocket according to the thirty-fourth aspect is configured so that the second internal pitch angle is equal to or larger than 40 degrees.

With the bicycle sprocket according to the thirty-fifth aspect, it is possible to reliably suppress the wrong assembly of the bicycle sprocket.

In accordance with a thirty-sixth aspect of the present invention, the bicycle sprocket according to the thirty-fourth aspect is configured so that the second internal pitch angle ranges from 25 degrees to 35 degrees.

With the bicycle sprocket according to the thirty-sixth aspect, it is possible to reliably suppress the wrong assembly of the bicycle sprocket.

In accordance with a thirty-seventh aspect of the present invention, the bicycle sprocket according to any one of the twenty-first to thirty-sixth aspects is configured so that at least one internal spline tooth of the at least ten internal spline teeth is circumferentially symmetric with respect to a reference line extending from the rotational center axis to a circumferential center point of a radially innermost end of the at least one internal spline tooth of the at least ten internal spline teeth in a radial direction with respect to the rotational center axis.

With the bicycle sprocket according to the thirty-seventh aspect, it is possible to improve productivity of the bicycle sprocket.

In accordance with an thirty-eighth aspect of the present invention, the bicycle sprocket according to any one of the twenty-first to thirty-seventh aspects is configured so that the at least ten internal spline teeth includes a plurality of internal-spline driving surfaces to receive a driving rotational force during pedaling. The plurality of internal-spline driving surfaces each includes a radially outermost edge, a radially innermost edge, and a radial length defined from the radially outermost edge to the radially innermost edge. A total of the radial lengths of the plurality of internal-spline driving surfaces is equal to or larger than 7 mm.

With the bicycle sprocket according to the thirty-eighth aspect, it is possible to ensure strength of the at least ten internal spline teeth.

In accordance with a thirty-ninth aspect of the present invention, the bicycle sprocket according to the thirty-eighth aspect is configured so that the total of the radial lengths is equal to or larger than 10 mm.

With the bicycle sprocket according to the thirty-ninth aspect, it is possible to ensure strength of the at least ten internal spline teeth.

In accordance with a fortieth aspect of the present invention, the bicycle sprocket according to the thirty-eighth or thirty-ninth aspect is configured so that the total of the radial lengths is equal to or smaller than 30 mm.

With the bicycle sprocket according to the fortieth aspect, it is possible to ensure strength of the at least ten internal spline teeth.

In accordance with a forty-first aspect of the present invention, the bicycle sprocket according to any one of the twenty-first to fortieth aspects is configured so that at least one internal spline tooth of the at least ten internal spline teeth includes an internal-spline driving surface. The internal-spline driving surface has a first internal-spline-surface angle defined between the internal-spline driving surface and a first radial line extending from a rotational center axis to a radially outermost edge of the internal-spline driving surface. The first internal-spline-surface angle ranges from 0 degree to 6 degrees.

With the bicycle sprocket according to the forty-first aspect, it is possible to effectively transmit a rotational force between the bicycle sprocket and another sprocket.

In accordance with a forty-second aspect of the present invention, the bicycle sprocket according to the forty-first aspect is configured so that the at least one internal spline tooth of the at least ten internal spline teeth includes an internal-spline non-driving surface. The internal-spline non-driving surface has a second internal-spline-surface angle defined between the internal-spline non-driving surface and a second radial line extending from the rotational center axis to a radially outermost edge of the internal-spline non-driving surface. The second internal-spline-surface angle ranges from 0 degree to 6 degrees.

With the bicycle sprocket according to the forty-second aspect, it is possible to effectively transmit a rotational force between the bicycle sprocket and another sprocket.

The structures of the larger and smaller sprockets S11 and S12 can apply to other sprockets of the plurality of bicycle sprockets S1 to S10.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body having an outer periphery and an inner periphery positioned radially inwardly from the outer periphery with respect to a rotational center axis of the bicycle sprocket;
a plurality of sprocket teeth disposed on the outer periphery of the sprocket body; and
a torque transmitting profile positioned around the inner periphery of the sprocket body, the torque transmitting profile including at least ten internal spline teeth, the at least ten internal spline-teeth including at least one first internal spline-tooth, at least one second internal spline-tooth and at least one third internal spline-tooth, the at least one internal first spline-tooth, the at least one second internal spline-tooth and the at least one third internal spline-tooth being different in shape from each other.

2. The bicycle sprocket according to claim 1, wherein
the at least one first internal spline-tooth has a first circumferential width with respect to the rotational center axis,
the at least one second internal spline-tooth has a second circumferential width with respect to the rotational center axis,
the at least one third internal spline-tooth has a third circumferential width with respect to the rotational center axis, and
the first circumferential width, the second circumferential width and the third circumferential width are different from each other.

3. The bicycle sprocket according to claim 1, wherein
the at least ten internal spline teeth include a first spline-tooth set and a second spline-tooth set,
the first spline-tooth set is disposed on a first axially-facing surface of the bicycle sprocket,
the second spline-tooth set is disposed on a second-axially facing surface of the bicycle sprocket, and
the first axially-facing surface faces toward a reverse direction relative to the second axially-facing surface in an axial direction with respect to the rotational center axis.

4. The bicycle sprocket according to claim 3, wherein
the first spline-tooth set includes the at least one first internal spline-tooth, the at least one second internal spline-tooth and the at least one third internal spline-tooth.

5. The bicycle sprocket according to claim 4, wherein
the first axially-facing surface faces axially outwardly in the axial direction with respect to a center plane of a bicycle in a mounting state where the bicycle sprocket is mounted to the bicycle.

6. The bicycle sprocket according to claim 3, wherein
the first spline-tooth set includes a plurality of spline teeth,
the second spline-tooth set includes a plurality of spline teeth, and
the plurality of spline teeth of the first spline-tooth set are offset from the plurality of spline teeth of the second spline-tooth set in a circumferential direction with respect to the rotational center axis.

7. The bicycle sprocket according to claim 1, wherein
the at least one first internal spline-tooth includes a plurality of first internal spline-teeth,
the at least one second internal spline-tooth is a single spline tooth, and
the at least one third internal spline-tooth is a single spline tooth.

8. The bicycle sprocket according to claim 1, wherein
the at least ten internal spline teeth have an internal-spline major diameter equal to or smaller than 33 mm.

9. The bicycle sprocket according to claim 8, wherein
the internal-spline major diameter is equal to or larger than 32 mm.

10. The bicycle sprocket according to claim 1, wherein
the at least ten internal spline teeth have an internal-spline minor diameter equal to or smaller than 31 mm.

11. The bicycle sprocket according to claim 10, wherein
the internal-spline minor diameter of is equal to or larger than 30 mm.

12. The bicycle sprocket according to claim 1, wherein
at least two internal spline teeth of the at least ten internal spline teeth are circumferentially arranged at a first internal pitch angle with respect to the rotational center axis, and
the first internal pitch angle ranges from 10 degrees to 20 degrees.

13. The bicycle sprocket according to claim 12, wherein
the first internal pitch angle ranges from 13 degrees to 16 degrees.

14. The bicycle sprocket according to claim 12, wherein
at least two other internal spline teeth of the at least ten internal spline teeth are circumferentially arranged at a second internal pitch angle with respect to the rotational center axis, and
the second internal pitch angle is equal to or larger than 20 degrees.

15. The bicycle sprocket according to claim 14, wherein
the second internal pitch angle is equal to or larger than 40 degrees.

16. The bicycle sprocket according to claim 14, wherein
the second internal pitch angle ranges from 25 degrees to 35 degrees.

17. The bicycle sprocket according to claim 1, wherein
at least one internal spline tooth of the at least ten internal spline teeth is circumferentially symmetric with respect to a reference line extending from the rotational center axis to a circumferential center point of a radially outermost end of the at least one internal spline tooth of the at least ten internal spline teeth in a radial direction with respect to the rotational center axis.

18. The bicycle sprocket according to claim 1, wherein
the at least ten internal spline teeth include a plurality of internal-spline driving surfaces to receive a driving rotational force from a bicycle rear hub assembly during pedaling,
the plurality of internal-spline driving surfaces each includes
a radially outermost edge,
a radially innermost edge, and
a radial length defined from the radially outermost edge to the radially innermost edge, and
a total of the radial lengths of the plurality of internal-spline driving surfaces is equal to or larger than 7 mm.

19. The bicycle sprocket according to claim 18, wherein
the total of the radial lengths is equal to or larger than 10 mm.

20. The bicycle sprocket according to claim 18, wherein
the total of the radial lengths is equal to or smaller than 30 mm.

21. The bicycle sprocket according to claim 1, wherein
at least one internal spline tooth of the at least ten internal spline teeth includes
an internal-spline driving surface having a first internal-spline-surface angle defined between the internal-spline driving surface and a first radial line extending from a rotational center axis to a radially outermost edge of the internal-spline driving surface, and
the first internal-spline-surface angle ranges from 0 degree to 6 degrees.

22. The bicycle sprocket according to claim 21, wherein
the at least one internal spline tooth of the at least ten internal spline teeth includes an internal-spline non-driving surface having a second internal-spline-surface angle defined between the internal-spline non-driving surface and a second radial line extending from the rotational center axis to a radially outermost edge of the internal-spline non-driving surface, and the second internal-spline-surface angle ranges from 0 degree to 6 degrees.

\* \* \* \* \*